US011601982B2

(12) United States Patent
Liu et al.

(10) Patent No.: US 11,601,982 B2
(45) Date of Patent: Mar. 7, 2023

(54) RANDOM ACCESS METHOD AND APPARATUS

(71) Applicant: HUAWEI TECHNOLOGIES CO., LTD., Guangdong (CN)

(72) Inventors: Zhe Liu, Shanghai (CN); Zhang Zhang, Shanghai (CN); Guohua Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 16/931,045

(22) Filed: Jul. 16, 2020

(65) Prior Publication Data

US 2020/0351950 A1    Nov. 5, 2020

Related U.S. Application Data

(63) Continuation of application No. PCT/CN2019/070639, filed on Jan. 7, 2019.

(30) Foreign Application Priority Data

Jan. 17, 2018 (CN) .......................... 201810045492.4

(51) Int. Cl.
    *H04W 74/08*     (2009.01)
    *H04W 72/04*     (2009.01)
    *H04W 72/0453*   (2023.01)

(52) U.S. Cl.
    CPC ..... *H04W 74/0833* (2013.01); *H04W 72/042* (2013.01); *H04W 72/0453* (2013.01); *H04W 72/0493* (2013.01)

(58) Field of Classification Search
    None
    See application file for complete search history.

(56) References Cited

U.S. PATENT DOCUMENTS

| | | | |
|---|---|---|---|
| 2019/0215706 A1* | 7/2019 | Tsai | H04W 72/042 |
| 2019/0215749 A1* | 7/2019 | Shih | H04W 36/30 |
| 2020/0396654 A1* | 12/2020 | Freda | H04W 36/08 |

FOREIGN PATENT DOCUMENTS

| | | |
|---|---|---|
| CN | 101883398 A | 11/2010 |
| CN | 107432032 A | 12/2017 |

(Continued)

OTHER PUBLICATIONS

Huawei et al.,"Overview of NR UL for LTE-NR coexistence",3GPP TSG RAN WG1 NR Ad Hoc Meeting,R1-1709979, Qingdao, China, Jun. 27-30, 2017, 12 pages.

(Continued)

*Primary Examiner* — Gregory B Sefcheck
*Assistant Examiner* — Srinivasa R Reddivalam
(74) *Attorney, Agent, or Firm* — Fish & Richardson P.C.

(57) ABSTRACT

Example random access methods and apparatuses are provided. One example method includes: receiving SUL configuration information, where the SUL configuration information includes at least one first SUL resource and at least one SUL selection threshold that are corresponding to a first SSB; determining, based on a downlink measurement value of the first SSB and the at least one SUL selection threshold, a carrier resource used for random access, where the carrier resource includes one of the at least one first SUL resource or includes a non-SUL resource corresponding to the first SSB; and performing random access on the determined carrier resource.

12 Claims, 8 Drawing Sheets

(56) References Cited

FOREIGN PATENT DOCUMENTS

WO  2009083927 A1  7/2009
WO  2017139050 A1  8/2017

OTHER PUBLICATIONS

3GPP TS 36.300 V15.0.0 (Dec. 2017),3rd Generation Partnership Project,Technical Specification Group Radio Access Network,Evolved Universal Terrestrial Radio Access (E-UTRA) and Evolved Universal Terrestrial Radio Access Network (E-UTRAN),Overall description,Stage 2(Release 15), 338 pages.
LG Electronics,"Remaining details on UL sharing between LTE and NR",3GPP TSG RAN WG1 Meeting Ad-Hoc, R1-1710354,Qingdao, P.R. China, Jun. 27-30, 2017, 6 pages.
3GPP TS 38.211 V15.0.0 (Dec. 2017),3rd Generation Partnership Project,Technical Specification Group Radio Access Network,NR,Physical channels and modulation(Release 15), 73 pages.
3GPP TS 38.213 V15.0.0 (Dec. 2017),3rd Generation Partnership Project,Technical Specification Group Radio Access Network,NR,Physical layer procedures for control(Release 15), 56 pages.
3GPP TS 38.321 V15.0.0 (Dec. 2017),3rd Generation Partnership Project,Technical Specification Group Radio Access Network,NR,Medium Access Control (MAC) protocol specification(Release 15), 55 pages.
3GPP TS 38.331 V15.0.0 (Dec. 2017),3rd Generation Partnership Project,Technical Specification Group Radio Access Network,NR, Radio Resource Control (RRC) protocol specification(Release 15), 188 pages.
PCT International Search Report and Written Opinion in International Application No. PCT/CN2019/070,639, dated Mar. 14, 2019, 14 pages (With English Translation).
Extended European Search Report issued in European Application No. 19741548.2 dated Nov. 25, 2020, 12 pages.
Huawei, HiSilicon, "Complete text proposal for NR random access procedure," 3GPP TSG-RAN WG2 Meeting #100, R2-1713939, Reno Nevada, USA, Nov. 27-Dec. 1, 2017, 10 pages.
Huawei, HiSilicon, "Further discussion on beam selection during handover," 3GPP TSG-RAN WG2 #100, R2-1712507, Reno, USA, Nov. 27-Dec. 1, 2017, 7 pages.
Huawei, HiSilicon, "Remaining issues in RACH Procedure," 3GPP TSG RAN WG1 Meeting #91, R1-1719501, Reno, USA, Nov. 27-Dec. 1, 2017,11 pages.
InterDigital, Inc., "Aspects related to Supplementary Uplink," 3GPP TSG RAN WG1 Meeting #91, R1-1720558, Reno, UDS, Nov. 27-Dec. 1, 2017, 5 pages.

\* cited by examiner

0: SSB0
1: SSB1
2: SSB2
3: SSB3
4: SSB4
5: SSB5
6: SSB6
7: SSB7

RANDOM ACCESS METHOD AND APPARATUS

CROSS-REFERENCE TO RELATED APPLICATIONS

This application is a continuation of international Application No. PCT/CN2019/070639, filed on Jan. 7, 2019, which claims priority to Chinese Patent Application No. 201810045492.4, filed on Jan. 17, 2018, The disclosures of the aforementioned applications are hereby incorporated by reference in their entireties.

TECHNICAL FIELD

This application relates to the field of communications technologies, and in particular, to a random access method and an apparatus.

BACKGROUND

With development of network technologies, in 5th generation mobile communication (5G) new radio (NR) standardization work, NR supports frequency bands from below 6 GHz to 60 GHz. Generally, frequency bands below 3 GHz are mainly used for long term evolution (LTE) carrier deployment, and frequency bands above 3 GHz are mainly used for NR carrier deployment.

During actual use, to fully utilize uplink resources on LTE carriers, NR uplink transmission and LTE uplink transmission can share an uplink resource on an LTE carrier. The uplink resource on the LTE carrier that can be shared for NR uplink transmission may be referred to as a supplementary uplink (SUL) resource of an NR carrier, and the NR carrier may be referred to as a non-SUL resource. Therefore, how to improve random access efficiency of a communications system by using an SUL resource or a non-SUL resource needs an urgent solution.

SUMMARY

Embodiments of this application provide a random access method and an apparatus, so as to select an appropriate resource from a non-SUl resource and at least one SUL resource to perform random access, thereby improving random access efficiency of a communications system.

According to a first aspect, an embodiment of this application provides a random access method, including:

receiving SUL configuration information, where the SUL configuration information includes at least one first supplementary uplink SUL resource and at least one SUL selection threshold that are corresponding to a first SSB;

determining, based on a downlink measurement value of the first SSB and the at least one SUL selection threshold, a carrier resource used for random access, where the carrier resource includes one of the at least one first SUL resource or includes a non-SUL resource corresponding to the first SSB; and performing random access on the determined carrier resource.

In the random access method embodiment provided in the first aspect, the SUL configuration information is received, where the SUL configuration information includes the at least one first supplementary uplink SUL resource and the at least one SUL selection threshold that are corresponding to the first SSB. Further, the carrier resource used for random access is determined based on the downlink measurement value of the first SSB and the at least one SUL selection threshold, and random access is performed on the determined carrier resource, where the carrier resource includes one of the at least one first SUL resource or includes the non-SUL resource corresponding to the first SSB. It can be learned that, in the embodiments of this application, an appropriate resource can be selected from the non-SUL resource and the at least one SUL resource to perform random access, thereby improving random access efficiency of a communications system of LTE-NR cosite deployment and/or LTE-NR non-cosite deployment.

In a possible implementation, if the SUL configuration information includes one first SUL resource corresponding to the first SSB and one SUL selection threshold corresponding to the first SSB, the determining, based on a downlink measurement value of the first SSB and the at least one SUL selection threshold, a carrier resource used for random access includes:

if the downlink measurement value of the first SSB is greater than or equal to the one SUL selection threshold corresponding to the first SSB, the carrier resource used for random access includes the non-SUL resource; or if the downlink measurement value of the first SSB is less than the one SUL selection threshold corresponding to the first SSB, the carrier resource used for random access includes the one first SUL resource corresponding to the first SSB.

In a possible implementation, if the SUL configuration information includes N1 first SUL resources corresponding to the first SSB and one SUL selection threshold corresponding to the first SSB, where N1 is an integer greater than or equal to 2, the determining, based on a downlink measurement value of the first SSB and the at least one SUL selection threshold, a carrier resource used for random access includes:

if the downlink measurement value of the first SSB is greater than or equal to the one SUL selection threshold corresponding to the first SSB, the carrier resource used for random access includes the non-SUL resource; or if the downlink measurement value of the first SSB is less than the one SUL selection threshold corresponding to the first SSB, determining, based on access priority information, that the carrier resource used for random access includes a second SUL resource in the N1 first SUL resources, where the access priority information is used to indicate an access priority order of the N1 first SUL resources, and an access priority of the second SUL resource is higher than a priority of a first SUL resource of the N1 first SUL resources other than the second SUL resource.

In a possible implementation, if the SUL configuration information includes N2 first SUL resources corresponding to the first SSB and N3 SUL selection thresholds corresponding to the first SSB, where N2 and N3 are integers greater than or equal to and one of the N2 first SUL resources is corresponding to one of the N3 SUL selection thresholds, the determining, based on a downlink measurement value of the first SSB and the at least one SUL selection threshold, a carrier resource used for random access includes:

determining a third SUL resource from the N2 first SUL resources based on access priority information, where the access priority information is used to indicate an access priority order of the N2 first SUL resources, and an access priority of the third SUL resource is higher than a priority of an SUL resource of the N2 first SUL resources other than the third SUL resource; and determining, based on the downlink measurement value of the first SSB and an SUL selection threshold corresponding to the third SUL resource, the carrier resource used for random access, where the carrier resource includes the third SUL resource or includes the non-SUL resource corresponding to the first SSB.

In a possible implementation, the determining, based on the downlink measurement value of the first SSB and an SUL selection threshold corresponding to the third SUL resource, the carrier resource used for random access includes:

if the downlink measurement value of the first SSB is greater than or equal to the SUL selection threshold corresponding to the third SUL resource, the carrier resource used for random access includes the non-SUL resource; or if the downlink measurement value of the first SSB is less than the SUL selection threshold corresponding to the third SUL resource, the carrier resource used for random access includes the third SUL resource.

In a possible implementation, if the SUL configuration information includes N4 first SUL resources corresponding to the first SSB and N4 SUL selection thresholds corresponding to the first SSB, where N4 is an integer greater than or equal to 2, and one of the N4 first SUL resources is corresponding to one of the N4 SUL selection thresholds; and the determining, based on a downlink measurement value of the first SSB and the at least one SUL selection threshold, a carrier resource used for random access includes:

if the downlink measurement value of the first SSB is less than an SUL selection threshold corresponding to a fourth SUL resource and is greater than or equal to a selection threshold corresponding to a fifth SUL resource, the carrier resource used for random access includes the fourth SUL resource, where the fourth SUL resource and the fifth SUL resource are included in the N4 first SUL resources;

if the downlink measurement value of the first SSB is less than an SUL selection threshold corresponding to a sixth SUL resource, the carrier resource used for random access includes the sixth SUL resource, where the SUL selection threshold corresponding to the sixth SUL resource is a smallest value of the N4 SUL selection thresholds; or if the downlink measurement value of the first SSB is greater than or equal to an SUL selection threshold corresponding to a seventh SUL resource, the carrier resource used for random access includes the non-SUL resource, where the SUL selection threshold corresponding to the seventh SUL resource is a largest value of the N4 SUL selection thresholds.

In a possible implementation, if the carrier resource used for random access includes the one of the at least one first SUL resource, the method further includes:

receiving a downlink reference signal based on configuration information of the downlink reference signal corresponding to the first SUL resource; and determining an uplink transmit power based on a downlink measurement value of the downlink reference signal, where the uplink transmit power is used for performing random access.

In a possible implementation, the SUL configuration information further includes the configuration information of the downlink reference signal corresponding to the first SUL resource.

In the random access method embodiment provided in this solution, the downlink reference signal is received based on the configuration information of the downlink reference signal corresponding to the first SUL resource, and the uplink transmit power used for performing random access is determined based on the downlink measurement value of the downlink reference signal, so as to perform, based on the uplink transmit power, random access to a network device that sends the downlink reference signal. It can be learned that, in the embodiments of this application, the uplink transmit power is determined based on a downlink measurement value of a downlink reference signal that is sent by a target network device of random access or a third network device specified by a target network device, so that the uplink transmit power can be accurately determined. This further improves the random access efficiency of the communications system.

According to a second aspect, an embodiment of this application provides a random access method, including:

sending SUL configuration information, where the SUL configuration information includes at least one first supplementary uplink SUL resource and at least one SUL selection threshold that are corresponding to a first SSB, the SUL configuration information is used to determine a carrier resource used for random access, and the carrier resource includes one of the at least one first SUL resource or includes a non-SUL resource corresponding to the first SSB; and receiving a random access preamble on the determined carrier resource.

In the random access method embodiment provided in the second aspect, the SUL configuration information (including the at least one first SUL resource and the at least one SUL selection threshold that are corresponding to the first SSB) is sent, so that a terminal device determines, based on a downlink measurement value of the first SSB and the at least one SUL selection threshold in the SUL configuration information, the carrier resource used for random access, and performs random access on the determined carrier resource, where the carrier resource includes the one of the at least one first SUL resource or the non-SUL resource corresponding to the first SSB. Further, the random access preamble sent by the terminal device is received on the determined carrier resource. It can be learned that, in the embodiments of this application, the terminal device can select an appropriate resource from the non-SUL resource and the at least one SUL resource to perform random access, thereby improving random access efficiency of a communications system of LTE-NR cosite deployment and/or LTE-NR non-cosite deployment.

According to a third aspect, an embodiment of this application provides an apparatus, including:

a first receiving module, configured to receive SUL configuration information, where the SUL configuration information includes at least one first supplementary uplink SUL resource and at least one SUL selection threshold that are corresponding to a first SSB;

a first determining module, configured to determine, based on a downlink measurement value of the first SSB and the at least one SUL selection threshold, a carrier resource used for random access, where the carrier resource includes one of the at least one first SUL resource or includes a non-SUL resource corresponding to the first SSB; and an access module, configured to perform random access on the determined carrier resource.

In a possible implementation, if the SUL configuration information includes one first SUL resource corresponding to the first SSB and one SUL selection threshold corresponding to the first SSB, the first determining module is specifically configured to:

if the downlink measurement value of the first SSB is greater than or equal to the one SUL selection threshold corresponding to the first SSB, determine that the carrier resource used for random access includes the non-SUL resource; or if the downlink measurement value of the first SSB is less than the one SUL selection threshold corresponding to the first SSB, determine that the carrier resource used for random access includes the one first SUL resource corresponding to the first SSB.

In a possible implementation, if the SUL configuration information includes N1 first SUL resources corresponding to the first SSB and one SUL selection threshold corresponding to the first SSB, where N1 is an integer greater than or equal to 2, the first determining module is specifically configured to:

if the downlink measurement value of the first SSB is greater than equal to the one SUL selection threshold corresponding to the first SSB, determine a the carrier resource used for random access includes the non-SUL resource; or if the downlink measurement value of the first SSB is less than the one SUL selection threshold corresponding to the first SSB, determine, based on access priority information, that the carrier resource used for random access includes a second SUL resource in the N1 first SUL resources, where the access priority information is used to indicate an access priority order of the N1 first SUL resources, and an access priority of the second SUL resource is higher than a priority of a first SUL resource of the N1 first SUL resources other than the second SUL resource.

In a possible implementation, if the SUL configuration information includes N2 first SUL resources corresponding to the first SSB and N3 SUL selection thresholds corresponding to the first SSB, where N2 and N3 are integers greater than or equal to and one of the N2 first SUL resources is corresponding to one of the N3 SUL selection thresholds, the first determining module includes:

a first determining unit, configured to determine a third SUL resource front the N2 first SUL resources based on access priority information, where the access priority information is used to indicate an access priority order of the N2 first SUL resources, and an access priority of the third SUL resource is higher than a priority of an SUL resource of the N2 first SUL resources other than the third SUL resource; and a second determining unit, configured to determine, based on the downlink measurement value of the first SSB and an SUL selection threshold corresponding to the third SUL resource, the carrier resource used for random access, where the carrier resource includes the third SUL resource or includes the non-SUL resource corresponding to the first SSB.

In a possible implementation, the second determining unit is specifically configured to:

if the downlink measurement value of the first SSB is greater than or equal to the SUL selection threshold corresponding to the third SUL resource, determine that the carrier resource used for random access includes the non-SUL resource; or if the downlink measurement value of the first SSB is less than the SUL selection threshold corresponding to the third SUL resource, determine that the carrier resource used for random access includes the third SUL resource.

In a possible implementation, if the SUL configuration information includes N4 first SUL resources corresponding to the first SSB and N4 SUL selection thresholds corresponding to the first SSB, where N4 is an integer greater than or equal to 2, and one of the N4 first SUL resources is corresponding to one of the N4 SUL selection thresholds, the first determining module is specifically configured to:

if the downlink measurement value of the first SSB is less than an SUL selection threshold corresponding to a fourth SUL resource and is greater than or equal to a selection threshold corresponding to a fifth SUL resource, determine that the carrier resource used for random access includes the fourth SUL resource, where the fourth SUL resource and the fifth SUL resource are included in the N4 first SUL resources;

if the downlink measurement value of the first SSB is less than an SUL selection threshold corresponding to a sixth SUL resource, determine that the carrier resource used for random access includes the sixth SUL resource, where the SUL selection threshold corresponding to the sixth SUL resource is a smallest value of the N4 SUL selection thresholds; or if the downlink measurement value of the first SSB is greater than or equal to an SUL selection threshold corresponding to a seventh SUL resource, determine that the carrier resource used for random access includes the non-SUL resource, where the SUL selection threshold corresponding to the seventh SUL resource is a largest value of the N4 SUL selection thresholds.

In a possible implementation, if the carrier resource used for random access includes the one of the at least one first SUL resource, the apparatus further includes:

a second receiving module, configured to receive a downlink reference signal based on configuration information of the downlink reference signal corresponding to the first SUL resource; and a second determining module, configured to determine an uplink transmit power based on a downlink measurement value of the downlink reference signal, where the uplink transmit power is used for performing random access.

In a possible implementation, the SUL configuration information further includes the configuration information of the downlink reference signal corresponding to the first SUL resource.

In a possible implementation, the apparatus may be a terminal device, or an apparatus that can be configured inside a terminal device.

For beneficial effects of the apparatus provided in the implementations of the third aspect, refer to beneficial effects brought by the implementations of the first aspect. Details are not described herein again.

According to a fourth aspect, an embodiment of this application provides an apparatus, including:

a sending module, configured to send SUL configuration information, where the SUL configuration information includes at least one first supplementary uplink SUL resource and at least one SUL selection threshold that are corresponding to a first SSB, the SUL configuration information is used to determine a carrier resource used for random access, and the carrier resource includes one of the at least one first SUL resource or includes a non-SUL resource corresponding to the first SSB; and a receiving module, configured to receive a random access preamble on the determined carrier resource.

In a possible implementation, the apparatus may be a network device, or an apparatus that can be configured inside a network device.

For beneficial effects of the apparatus provided in the implementations of the fourth aspect, refer to beneficial effects brought by the implementations of the second aspect. Details are not described herein again.

According to a fifth aspect, an embodiment of this application provides an apparatus. The apparatus includes a processor, configured to implement the method described in the first aspect. The apparatus may further include a memory, configured to store a program instruction and data. The memory is coupled to the processor, and the processor can invoke and execute the program instruction stored in the memory, to implement the method described in the first aspect.

Optionally, the apparatus may further include a communications interface, configured to perform communication between the apparatus and another apparatus. For example, the another apparatus is a network device.

In a possible implementation, the apparatus includes:
the communications interface; and
the memory, configured to store a program instruction; where
the processor is configured to receive SUL configuration information by using the communications interface, where the SUL configuration information includes at least one first supplementary uplink SUL resource and at least one SUL selection threshold that are corresponding to a first SSB;

the processor is further configured to determine, based on a downlink measurement value of the first SSB and the at least one SUL selection threshold, a carrier resource used for random access, where the carrier resource includes one of the at least one first SUL resource or includes a non-SUL resource corresponding to the first SSB; and the processor is further configured to perform random access on the determined carrier resource by using the communications interface.

In a possible implementation, if the SUL configuration information includes one first SUL resource corresponding to the first SSB and one SUL selection threshold corresponding to the first SSB, the processor is further configured to:

if the downlink measurement value of the first SSB is greater than or equal to the one SUL selection threshold corresponding to the first SSB, determine that the carrier resource used for random access includes the non-SUL resource; or if the downlink measurement value of the first SSB is less than the one SUL selection threshold corresponding to the first SSB, determine that the carrier resource used for random access includes the one first SUL resource corresponding to the first SSB.

In a possible implementation, if the SUL configuration information includes N1 first SUL resources corresponding to the first SSB and one SUL selection threshold corresponding to the first SSB, where N1 is an integer greater than or equal to 2, the processor is further configured to:

if the downlink measurement value of the first SSB is greater than or equal to the one SUL selection threshold corresponding to the first SSB, determine that the carrier resource used for random access includes the non-SUL resource; or if the downlink measurement value of the first SSB is less than the one SUL selection threshold corresponding to the first SSB, determine, based on access priority information, that the carrier resource used for random access includes a second SUL resource in the N1 first SUL resources, where the access priority information is used to indicate an access priority order of the N1 first SUL resources, and an access priority of the second SUL resource is higher than a priority of a first SUL resource of the N1 first SUL resources other than the second SUL resource.

In a possible implementation, if the SUL configuration information includes N2 first SUL resources corresponding to the first SSB and N3 SUL selection thresholds corresponding to the first SSB, where N2 and N3 are integers greater than or equal to and one of the N2 first SUL resources is corresponding to one of the N3 SUL selection thresholds, the processor is further configured to:

determine a third SUL resource from the N2 first SUL resources based on access priority information, where the access priority information is used to indicate an access priority order of the N2 first SUL resources, and an access priority of the third SUL resource is higher than a priority of an SUL resource of the N2 first SUL resources other than the third SUL resource; and determine, based on the downlink measurement value of the first SSB and an SUL selection threshold corresponding to the third SUL resource, the carrier resource used for random access, where the carrier resource includes the third SUL resource or includes the non-SUL resource corresponding to the first SSB.

In a possible implementation, the processor is further configured to:

if the downlink measurement value of the first SSB is greater than or equal to the SUL selection threshold corresponding to the third SUL resource, determine that the carrier resource used for random access includes the non-SUL resource; or if the downlink measurement value of the first SSB is less than the SUL selection threshold corresponding to the third SUL resource, determine that the carrier resource used for random access includes the third SUL resource.

In a possible implementation, if the SUL configuration information includes N4 first SUL resources corresponding to the first SSB and N4 SUL selection thresholds corresponding to the first SSB, where N4 is an integer greater than or equal to 2, and one of the N4 first SUL resources is corresponding to one of the N4 SUL selection thresholds, the processor is further configured to:

if the downlink measurement value of the first SSB is less than an SUL selection threshold corresponding to a fourth SUL resource and is greater than or equal to a selection threshold corresponding to a fifth SUL resource, determine that the carrier resource used for random access includes the fourth SUL resource, where the fourth SUL resource and the fifth SUL resource are included in the N4 first SUL resources;

if the downlink measurement value of the first SSB is less than an SUL selection threshold corresponding to a sixth SUL resource, determine that the carrier resource used for random access includes the sixth SUL resource, where the SUL selection threshold corresponding to the sixth SUL resource is a smallest value of the N4 SUL selection thresholds; or if the downlink measurement value of the first SSB is greater than or equal to an SUL selection threshold corresponding to a seventh SUL resource, determine that the carrier resource used for random access includes the non-SUL resource, where the SUL selection threshold corresponding to the seventh SUL resource is a largest value of the N4 SUL selection thresholds.

In a possible implementation, if the carrier resource used for random access includes the one of the at least one first SUL resource, the processor is further configured to receive, by using the communications interface, a downlink reference signal based on configuration information of the downlink reference signal corresponding to the first SUL resource; and the processor is further configured to determine an uplink transmit power based on a downlink measurement value of the downlink reference signal, where the uplink transmit power is used for performing random access.

In a possible implementation, the SUL configuration information further includes the configuration information of the downlink reference signal corresponding to the first SUL resource.

In a possible implementation, the apparatus may be a terminal device, or an apparatus that can be configured inside a terminal device.

For beneficial effects of the apparatus provided in the implementations of the fifth aspect, refer to beneficial effects brought by the implementations of the first aspect. Details are not described herein again.

According to a sixth aspect, an embodiment of this application provides a chip system. The chip system includes a processor, and may further include a memory. The chip system is configured to implement the method described in any one of the first aspect or the possible implementations of the first aspect. The chip system may include a chip, or may include a chip and another discrete device.

According to a seventh aspect, an embodiment of this application provides a program. When the program is executed by a processor, the program is used to perform the method in any one of the first aspect or the possible implementations of the first aspect.

According to an eighth aspect, an embodiment of this application provides a computer program product including an instruction. When the computer program product is run on a computer, the computer is enabled to perform the method in any one of the first aspect or the possible implementations of the first aspect.

According to a ninth aspect, an embodiment of this application provides a computer-readable storage medium. The computer-readable storage medium stores an instruction. When the instruction is run on a computer, the computer is enabled to perform the method in any one of the first aspect or the possible implementations of the first aspect.

According to a tenth aspect, an embodiment of this application provides an apparatus. The apparatus includes a processor, configured to implement the method described in the second aspect. The apparatus may further include a memory, configured to store a program instruction and data. The memory is coupled to the processor, and the processor can invoke and execute the program instruction stored in the memory, to implement the method described in the second aspect.

Optionally, the apparatus may further include a communications interface, configured to perform communication between the apparatus and another apparatus. For example, the another apparatus is a terminal device.

In a possible implementation, the apparatus includes:
the communications interface; and
the memory, configured to store a program instruction; where
the processor is configured to send SUL configuration information by using the communications interface, where the SUL configuration information includes at least one first supplementary uplink SUL resource and at least one SUL selection threshold that are corresponding to a first SSB, the SUL configuration information is used to determine a carrier resource used for random access, and the carrier resource includes one of the at least one first SUL resource or includes a non-SUL resource corresponding to the first SSB; and
the processor is further configured to receive a random access preamble on the determined carrier resource by using the communications interface.

In a possible implementation, the apparatus may be a network device, or an apparatus that can be configured inside a network device.

For beneficial effects of the apparatus provided in the implementations of the fourth aspect, refer to beneficial effects brought by the implementations of the second aspect. Details are not described herein again.

According to an eleventh aspect, an embodiment of this application provides a chip system. The chip system includes a processor, and may further include a memory. The chip system is configured to the implement the method described in any one of the second aspect or the possible implementations of the second aspect. The chip system may include a chip, or may include a chip and another discrete device.

According to a twelfth aspect, an embodiment of this application provides a program. When the program is executed by a processor, the program is used to perform the method in any one of the second aspect or possible implementations of the second aspect.

According to a thirteenth aspect, an embodiment of this application provides a computer program product including an instruction. When the computer program product is run on a computer, the computer is enabled to perform the method in any one of the second aspect or the possible implementations of the second aspect.

According to a fourteenth aspect, an embodiment of this application provides a computer-readable storage medium. The computer-readable storage medium stores an instruction. When the instruction is run on a computer, the computer is enabled to perform the method in any one of the second aspect or the possible implementations of the second aspect.

According to a fifteenth aspect, an embodiment of this application provides a communications system, including the apparatus described in any one of the third aspect or the possible implementations of the third aspect and the apparatus described in the fourth aspect.

According to a sixteenth aspect, an embodiment of this application provides a communications system, including the apparatus described in any one of the fifth aspect or the possible implementations of the fifth aspect and the apparatus described in the tenth aspect.

According to the random access method and the apparatus provided in the embodiments of this application, the network device sends the SUL configuration information (including the at least one first SUL resource and the at least one SUL selection threshold that are corresponding to the first SSB) that is used by the terminal device to determine the carrier resource used for random access. Further, the terminal device determines, based on the downlink measurement value of the first SSB and the at least one SUL selection threshold, the carrier resource used for random access, and performs random access on the determined carrier resource, where the carrier resource includes the one of the at least one first SUL resource or includes the non-SUL resource corresponding to the first SSB. Further, the network device receives, on the determined carrier resource, the random access preamble sent by the terminal device. It can be learned that, in the embodiments of this application, an appropriate resource can be selected from the non-SUL resource and the at least one SUL resource to perform random access, thereby improving the random access efficiency of the communications system of the LTE-NR cosite deployment and/or non-cosite deployment.

BRIEF DESCRIPTION OF DRAWINGS

FIG. 23 is a schematic structural diagram in which an SSB is corresponding to one SUL resource according to an embodiment of this application.

DESCRIPTION OF EMBODIMENTS

First, communication scenarios and some terms used in the embodiments of this application are described.

Figure 1A:
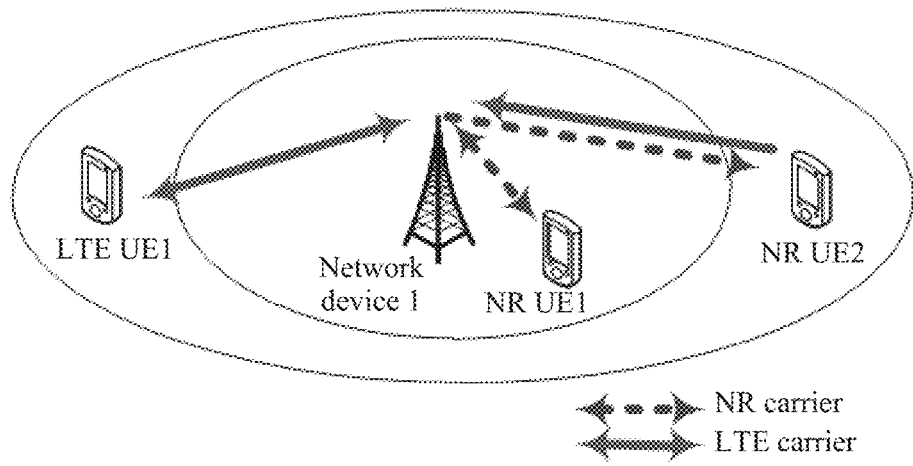
FIG. 1A is an example diagram 1 of a communication scenario according to an embodiment of this application.
Figure 1B:
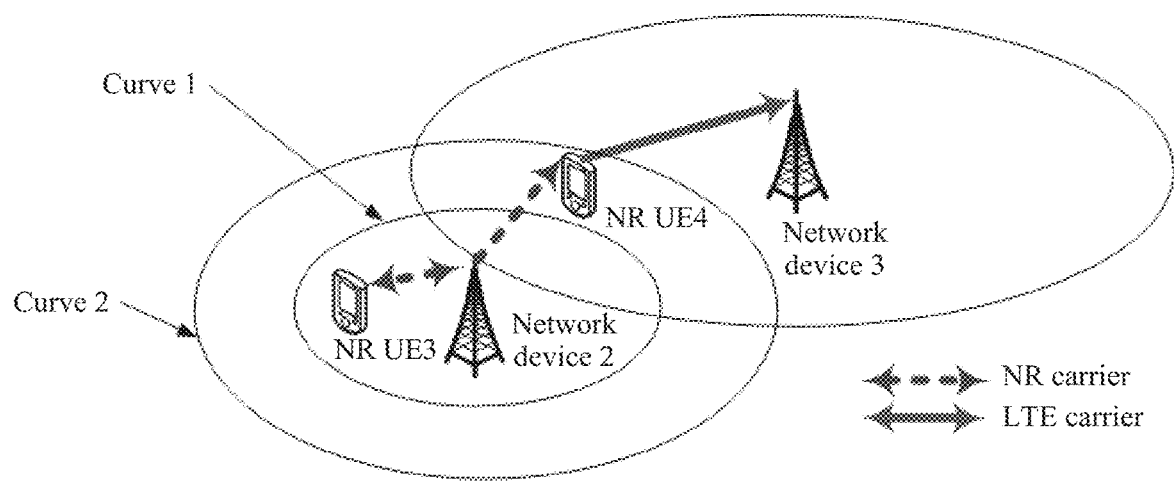
FIG. 1B is an example diagram 2 of a communication scenario according to an embodiment of this application.
Figure 1C:
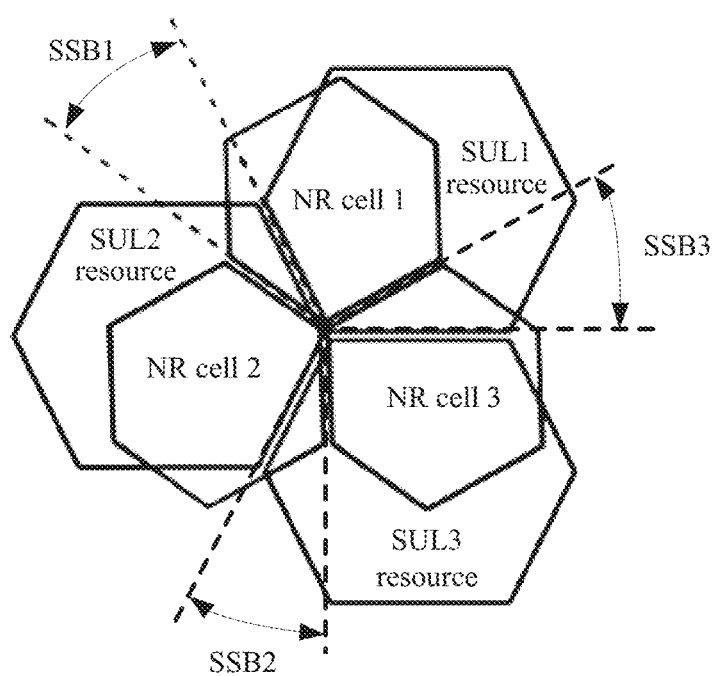
FIG. 1C is an example diagram 3 of a communication scenario according to an embodiment of this application.

FIG. 1A is an example diagram 1 of a communication scenario according to an embodiment of this application. FIG. 1B is an example diagram 2 of a communication scenario according to an embodiment of this application. FIG. 1C is an example diagram 3 of a communication scenario according to an embodiment of this application.

In the wireless communication scenario of LTE-NR cosite deployment shown in FIG. 1A, LTE user equipment (UE) 1 is an LTE terminal (which can use uplink and downlink resources on an LTE carrier to perform signal transmission with a network device 1), NR UE1 is an NR terminal (which can use uplink and downlink resources on an NR carrier to perform signal transmission with the network device 1), and NR UE2 is an NR terminal that supports uplink sharing (which can use uplink and downlink resources on an NR carrier to perform signal transmission with the network device 1, and can also use an SUL resource to perform uplink transmission with the network device 1). Optionally, if the NR UE2 uses an uplink resource on an NR carrier (that is, a non-SUL resource) to send an uplink signal to the network device 1, quality of the uplink signal received by the network device 1 may be relatively poor due to a relatively high frequency and a relatively large path loss of the NR carrier, a limited power of the NR UE2, or the like, and the uplink signal cannot be correctly received. Therefore, the NR UE2 can use an SUL resource (which has a relatively small path loss at a low frequency) to send the uplink signal to the network device 1, so as to improve NR uplink coverage. In the embodiments of this application, signal transmission may also be described as information transmission or data transmission.

In the wireless communication scenario of LTE-NR non-cosite deployment shown in FIG. 19, for a network device 2, a curve 1 represents a boundary line of an NR uplink coverage area, a curve 2 represents a boundary line of an NR downlink coverage area, and a ring area between the curve 2 and the curve 1 represents an area in which uplink coverage and downlink coverage do not overlap, NR UE3 is an NR terminal (which can use uplink and downlink resources on an NR carrier to perform signal transmission with the network device 2). NR UE4 is an NR terminal that supports uplink sharing (which can use uplink and downlink resources on an NR carrier to perform signal transmission with the network device 2, and can also use an SUL resource to perform uplink transmission with a network device 3). Optionally, if the NR UE4 uses an uplink resource on an NR carrier (that is, a non-SUL resource) to send an uplink signal to the network device 2, quality of the uplink signal received by the network device 2 may be relatively poor due to a relatively high frequency and a relatively large path loss of the NR carrier, and the uplink signal cannot be correctly received. Therefore, the NR UE4 can use an SUL resource to send the uplink signal to the network device 3 (in other words, a downlink sending node and an uplink receiving node of the NR UE4 are not one node), and then the network device 3 may send the uplink signal to the network device 2, thereby improving a part of NR uplink coverage of the network device 2. Optionally, as shown in FIG. 1B, a plurality of other LTE carriers are further required to seamlessly improve NR uplink coverage for the ring area between the curve 2 and the curve 1 (in other words, one NR carrier requires a plurality of SUL resources to improve uplink coverage).

Due to a difference between an LTE coverage angle and NR coverage angle caused by network device deployment, in the wireless communication scenario of LTE-NR cosite deployment shown in FIG. 1C, for example, a synchronization signal block (SSB) 1 in an NR cell 1 is associated with an SUL2 resource, and an SSB in the NR cell 1 other than the SSB1 is associated with an SUL1 resource. In other words, the SUL1 resource and the SUL2 resource are used to improve uplink coverage of the NR cell 1. For example, an SSB2 in an NR cell 2 is associated with an SUL3 resource, and an SSB in the NR cell 2 other than the SSB2 is associated with the SUL2 resource. In other words, the SUL2 resource and the SUL3 resource are used to improve uplink coverage of the NR cell 2. For example, an SSB3 in an NR cell 3 is associated with the SUL1 resource, and an SSB in the NR cell 3 other than the SSB3 is associated with the SUL3 resource. In other words, the SUL1 resource and the SUL3 resource are used to improve uplink coverage of the NR cell 3.

Certainly, the random access method and the apparatus provided in the embodiments of this application are also applicable to another scenario. This is not limited in the embodiments of this application.

In the embodiments of this application, an apparatus that performs a terminal device (or referred to as a terminal) side method may be a terminal device or an apparatus in a terminal device. For example, the apparatus in the terminal device may be a chip system, a circuit, a module, or the like. This is not limited in this application. It should be noted that the terminal device (for example, an NR terminal that supports uplink sharing) is used as an example for description in the embodiments provided in this application.

In the embodiments of this application, an apparatus that performs a network device side method may be a network device or an apparatus in a network device. For example, the apparatus in the network device may be a chip system, a circuit, a module, or the like. This is not limited in this application. It should be noted that the network device is used as an example for description in the embodiments provided in this application.

The terminal device in the embodiments of this application may also be referred to as a terminal, and the terminal device may be a wired terminal or a wireless terminal. The wireless terminal may be a device with a wireless transmission/reception function. The terminal device in the embodiments of this application may be deployed on land, including deployed indoors or outdoors, held in hand or deployed in vehicle; may be deployed on water (for example, on a ship); or may be deployed in air (for example, on an air plane, a balloon, or a satellite). The terminal device in the embodiments of this application may be user equipment (UE). The UE includes a handheld device with a wireless communication function, a vehicle-mounted device, a wearable device, or a computing device. For example, the UE may be a mobile phone, a tablet computer, or a computer with a wireless transmission/reception function. The terminal device may alternatively be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. In the embodiments of this application, an apparatus that implements a function of a terminal may be a terminal, or may be an apparatus that supports the terminal in implementing the function. In the embodiments of this application, an example in which the apparatus that implements the function of the terminal is a terminal, and the terminal UE is used to describe the technical solutions provided in the embodiments of this application.

A network device in this application may include but is not limited to a base station (BS) and a transmission reception point (TRP). The network device may be a device that is deployed in a radio access network and that can communicate with a terminal. The base station may also be referred to as a radio access network (RAN) device. The network device in the embodiments of this application may be a base station (base transceiver station, BTS) in global system for mobile communications (GSM) or code division multiple access (CDMA), may be a NodeB (NB) in wideband code division multiple access (WCDMA), may be an evolved NodeB (eNB or eNodeB) in long term evolution (LTE), a relay node, or an access point, or may be a base station in a future 5G network, or the like. This is not limited herein. The base station in the 5G network may also be referred to as a gNB.

The terminal device or the network device in this application may include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, such as a Linux operating system, a Unix operating system, an Android operating system, an iOS operating system, or a Windows operating system. The application layer includes applications such as a browser, a contact list, word processing software, and instant messaging software.

A random access procedure provided in the embodiments of this application may include the following steps.

1. A terminal device sends a random access preamble to a network device.

Optionally, before initiating random access, the terminal device receives configuration information of an uplink resource sent by the network device. The configuration information of the uplink resource may include but is not limited to at least one of the following: frequency-domain information of the uplink resource and common configuration information of the uplink resource. The frequency-domain information of the uplink resource may include but is not limited to at least one of the following: frequency channel number information of an uplink carrier and offset information of an uplink subcarrier. The common configuration information of the uplink resource may include but is not limited to at least one of the following: random access channel (RACH) configuration information, physical uplink shared channel (PUSCH) configuration information, physical uplink control channel (PUCCH) configuration information, sounding reference signal (SRS) configuration information, and power control configuration information. The RACH configuration information may include but is not limited to at least one of the following: a time-domain (a subframe, a slot, a symbol, a period, and/or the like) resource, a frequency-domain (resource block information, whether frequency hopping is performed, and/or the like) resource, and a code division multiplexing (an orthogonal cover code, a cyclic shift, and/or the like) resource that are of a physical random access channel (PRACH). In other words, a PRACH resource includes a time-domain resource, a frequency-domain resource, and/or a code-domain resource.

Optionally, the configuration information of the uplink resource may be carried in a system information block (SIB), or certainly may be carried in another message. This is not limited in the embodiments of this application.

In this embodiment, the terminal device may select one random access preamble based on a random access preamble resource carried in the configuration information of the uplink resource that is sent by the network device, and send the random access preamble (that is, an M1 message) on a PRACH resource indicated by the configuration information of the uplink resource.

2. The network device sends a random access response to the terminal device.

In this embodiment, the network device may perform blind detection on the random access preamble on the PRACH resource in the configuration information of the uplink resource broadcast by the network device. If the network device detects the random access preamble, the network device feeds back, on a physical downlink shared channel (PDSCH), a random access response (RAR) for the random access preamble. Optionally, the PDSCH may carry a MAC protocol data unit (PDU) including at least one media access control (MAC)-subheader and at least one RAR, where one RAR is corresponding to one MAC-subheader. One MAC-subheader includes but is not limited to a random access preamble identity (RAPID) in the M1 message. One RAR (that is, an M2 message) may include but is not limited to at least one of the following: an uplink timing advance (TA) of the terminal device, a backoff parameter, PUSCH uplink scheduling information that is allocated for transmitting an M3 message (including but not limited to: whether frequency hopping is performed, a modulation and coding rate, an access resource, an access moment, and other content), and a temporary cell radio network temporary identifier (RNTI).

Optionally, the RAR may be an independent MAC PDU, and/or may be carried on a downlink (DL)-shared channel (SCH).

In this embodiment, after sending the random access preamble, the terminal device may detect whether any RAR for the random access preamble is sent to the terminal device. For example, the terminal device needs to decode content of the RAR that is carried on a PDSCH and that responds to the terminal device. Optionally, a physical downlink control channel (PDCCH) is obtained through decoding by using a random access radio network temporary identifier (RA-RNTI), where the PDCCH carries resource allocation information of a PDSCH. Further, the terminal device continues to decode content in the PDSCH based on the resource allocation information of the PDSCH, to obtain a MAC PDU that carries the RAR. Optionally, both the terminal device and the network device can determine the RA-RNTI based on a PRAM time-frequency resource location that is used for carrying the M1 message.

Optionally, one MAC PDU may include a plurality of RARs and a plurality of MAC-subheaders (one RAR is corresponding to one MAC-subheader). The terminal device may separately compare RAPIDs carried in the plurality of MAC-subheaders with an identity of the random preamble sent by the terminal device. If the identity of the random preamble sent by the terminal device is the same as an RAPID carried in a MAC-subheader, an RAR corresponding to the MAC-subheader is the RAR of the random preamble sent for the terminal device, and further, the terminal device decodes content of the RAR corresponding to the MAC-subheader.

3. The terminal device sends the M3 message to the network device.

In this step, if the terminal device determines that the random access response of the random preamble that is sent by the network device to the terminal device has been received, the terminal device can obtain uplink synchronization based on an uplink TA adjustment value carried in the RAR, and send first scheduled UL transmission (that is, the M3 message) on an uplink resource that is allocated by the network device to the terminal device, so that uplink transmissions of different terminal devices simultaneously reach the network device. For example, the M3 message may include but is not limited to: a radio resource control (RRC) connection setup message (connection request) and/or an RRC re-establishment message (RRC connection re-establishment Request). Optionally, the first scheduled UL transmission may be carried on an uplink (UL)-SCH.

4. The network device sends an M4 message to the terminal device.

In this embodiment, the network device may send contention resolution (that is, the M4 message) to the terminal device, to complete contention resolution. Optionally, in cases of initial access and re-establishment, a MAC PDU in the M4 message carries a contention resolution identifier, such as an RRC connection request and/or an RRC connection re-establishment request.

Further, after decoding a PDCCH channel, the terminal device may continue to obtain, from a PDSCH channel, MAC PDU content in the M4 message, and compare the MAC PDU content with a common control channel (CCCH) service data unit (SDU) that was previously sent in the M3 message by the terminal device. If the MAC PDU content is the same as the CCCH SDU, contention resolution succeeds.

Certainly, the random access procedure in the embodiments of this application may be implemented in another possible implementation, and this is not limited in the embodiments of this application.

An SSB in the embodiments of this application may include but is not limited to one or more of the following: a primary synchronization signal (PSS), a secondary synchronization signal (SSS), and a physical broadcast channel (PBCH). The PSS and the SSS may be used to determine a physical cell identifier (PCID) of an NR carrier, and may also be used by the terminal device to obtain downlink time-frequency synchronization. The PBCH may be used to transmit a master information block (MIB) of an NR carrier, and may also be used by the terminal device to obtain a downlink system frame number and an SSB index. The MIB may be used to configure a time-frequency resource location of a control channel that schedules a system information block (SIB), so that the terminal device can obtain another system message based on the MIB, for example, remaining minimum system information (RMSI).

The network device in the embodiments of this application may manage one or more cells (there may be at least one terminal device in one cell, and the terminal device may communicate with the network device in the cell). Optionally, corresponding to one cell, the network device may send a plurality of SSBs (one SSB may have one index, and optionally, an index value of an SSB may be indicated by using a demodulation reference signal DMRS sequence of a PBCH and/or a system message carried by the PBCH). The plurality of SSBs sent by the network device may carry a same physical cell identity (PCID).

To ensure an appropriate subcarrier spacing for frequency bands below 6 GHz and frequency bands above 6 GHz, for higher system transmission efficiency, NR supports a plurality of subcarrier spacings. Optionally, a subcarrier spacing such as 15 kHz, 30 kHz, 120 kHz, or 240 kHz can be used to send an SSB, and a plurality of SSBs can be sent in a half-frame window of 5 ms.

For example, when the subcarrier spacing of 15 kHz is used, a maximum of four SSBs are sent in a half-frame window of 5 ms of an NR carrier at a frequency band below 3 GHz, where one SSB may be mapped onto four orthogonal frequency division multiplexing (OFDM) symbols; and a maximum of eight SSBs can be sent in a half-frame window of 5 ms of an NR carrier at a frequency band between 3 GHz and 6 GHz.

For example, when the subcarrier spacing of 30 kHz is used, a maximum of four SSBs are sent in a half-frame window of 5 ms of an NR carrier at a frequency band below 3 GHz, where one SSB may be mapped onto four OFDM symbols; and a maximum of eight SSBs can be sent in a half-frame window of 5 ms of an NR carrier at a frequency band between 3 GHz and 6 GHz.

For example, when the subcarrier spacing of 120 kHz or 240 kHz is used, a maximum of 64 SSBs can be sent in a half-frame window of 5 ms of an NR carrier.

Optionally, in a half-frame window in which a maximum of eight SSBs are transmitted, an SSB index is indicated by a demodulation reference signal (DMRS) sequence in a PBCH; and in a half-frame window in which a maximum of 64 SSBs are transmitted, three lower order bits of an SSB index are indicated by a DMRS sequence in a PBCH, and three higher order bits of the SSB index are indicated by using a system message. For example, the system message may include, but is not limited to a MIB, a SIB, and RMSI.

In the embodiments of this application, the terminal device and/or the network device may use a beamforming technology to send and receive signals. Optionally, beamforming, which may also be referred to as spatial domain filtering, is a signal processing technology of using a sensor array to directionally send and receive signals. In the beamforming technology, a parameter of a basic unit of a phase array may be adjusted, so that signals at some angles obtain constructive interference and signals at other angles obtain destructive interference.

Considering that a higher frequency corresponds to a larger path loss, a path loss caused by a high frequency can be compensated for by enhancing beam directivity. In other words, a higher frequency requires a larger quantity of beams. For example, a high-frequency carrier needs to use a plurality of beams or beam scanning to cover an entire cell.

Optionally, during initial access, the terminal device performs blind detection on an SSB to obtain downlink time-frequency synchronization, obtain index information of the SSB, and further distinguish between different beams based on the SSB. One SSB may be corresponding to one beam, or one SSB is corresponding to a plurality of beams. For example, for a frequency band below 6 GHz, cell coverage requires a relatively small quantity of beams, and one SSB may be corresponding to one beam; and for a frequency band above 6 GHz, cell coverage requires a relatively large quantity of beams, and one SSB may be corresponding to a plurality of beams (optionally, at least one beam corresponding to a same SSB index may be considered as one beam).

Considering that the network device may send a plurality of SSBs, a first SSB in the embodiments of this application is a first SSB that is determined by the terminal device from at least one second SSB received from a first network device. A downlink measurement value of a second SSB is greater than an SSB selection threshold. For example, the terminal device may determine, based on a downlink measurement value of at least one second SSB, a second SSB with a largest downlink measurement value of the at least one downlink measurement value as the first SSB. For example, assuming that the terminal device receives five SSBs, and that downlink measurement values of an SSB11, an SSB13, and an SSB15 (for example, the downlink measurement value of the SSB13 is greater than the downlink measurement value of the SSB15, and the downlink measurement value of the SSB15 is greater than the downlink measurement value of the SSB11) are greater than the SSB selection threshold, the terminal device determines the SSB (for example, the SSB13) with the largest downlink measurement value of the SSB11, the SSB13, and the SSB15 as the first SSB. For example, the terminal device may randomly determine the first SSB from the received at least one second SSB. Certainly, the terminal device may determine the first SSB from the at least one second. SSB in another manner. This is not limited in the embodiments of this application.

A downlink reference signal in the embodiments of this application may be a reference signal that is sent by a network device (for example, a third network device, where the third network device may be a same network device as the first network device, or may be a different network device from the first network device) corresponding to an SUL resource selected by the terminal device to perform random access, the downlink reference signal is used by the terminal device to determine an uplink path loss generated when random access is performed by using the SUL resource, and/or is used to distinguish between a plurality of intra-frequency SUL resources.

Optionally, when the downlink reference signal in the embodiments of this application is an NR reference signal, the downlink reference signal may include a reference signal such as an SSB or a channel state information-reference signal (CSI-RS). When the downlink reference signal in the embodiments of this application is an LTE reference signal, the downlink reference signal may include a reference signal such as a cell reference signal (CRS) or a CSI-RS.

Configuration information of a downlink reference signal in the embodiments of this application may be used to indicate al least one of the following: location information of a downlink resource carrying the downlink reference signal, transmit power information corresponding to the downlink reference signal, and PCID information of a carrier on which the downlink reference signal is located. Optionally, the configuration information of the downlink reference signal may include, but is not limited to at least one of the following: an absolute radio frequency channel number of a downlink resource carrying the downlink reference signal, information about an offset between the absolute radio frequency channel number of the downlink resource carrying the downlink reference signal and a subcarrier 0 of the downlink resource carrying the downlink reference signal (the offset may be measured in a subcarrier spacing of the downlink reference signal, measured in a PRB based on a subcarrier spacing of the downlink reference signal, or the like), transmit power information of the downlink reference signal (used to obtain a downlink path loss between the third network device sending the downlink reference signal and the terminal device), PCID information of a carrier on which the downlink reference signal is located, and information about a path loss adjustment value caused by a frequency-domain deviation between the downlink reference signal and an SUL resource. Optionally, the configuration information of the downlink reference signal may be used to indicate location information of a downlink carrier, bandwidth information, a transmit power of a reference signal, PCID information of the downlink carrier, information about a path loss adjustment value caused by a frequency-domain deviation between the downlink carrier and an SUL resource, and the like.

The absolute radio frequency channel number of the downlink reference signal may be similar to a field indicating an E-UTRA absolute radio frequency channel number (EARFCN) in LTE, that is, a field used to indicate an EARFCN in an evolved universal terrestrial radio access network (EUTRAN). An EARFCN (unit: megahertz MHz) of an LIT uplink resource may be calculated according to the following rule: FUL=FUL_low+0.1(NUL—NOffs-UL), where NUL represents the EARFCN of the LTE uplink resource, FUL represents a center frequency channel number of the LTE uplink resource, FUL_low represents a lowest frequency at an uplink frequency band, 0.1 represents a raster size 100 kHz of uplink and downlink resources on an LTE carrier, and NOffs-UL represents an EARFCN corresponding to the lowest frequency at the frequency band of the uplink resource on the LTE carrier. Specific parameters are shown in Table 1. Calculation of the EARFCN is related to a definition of an NR frequency band and definitions of raster sizes of uplink and downlink resources within a frequency band. Certainly, the absolute radio frequency channel number of the downlink reference signal may be alternatively calculated in another manner. This is not limited in the embodiments of this application.

TABLE 1

| | Parameter table | | | | | |
|---|---|---|---|---|---|---|
| | Downlink | | | Uplink | | |
| Frequency band | FDL_low (unit: MHz) | NOffs-DL | NDL range | FUL_low (unit: MHz) | NOffs-UL | NUL range |
| 1 | 2110 | 0 | 0-599 | 1920 | 13000 | 13000-3599 |
| ... | | | | | | |
| 38 | 2570 | 27675 | 27675-28159 | 2570 | 27675 | 27675-28159 |

Physically, a network device related to NR DL (for example, a non-SUL resource) downlink transmission and NR UL (for example, a non-SUL resource) uplink reception in the embodiments of this application is the first network device, and a network device related to NR SUL uplink reception in the embodiments of this application is the second network device. If the first network device and the second network device are one device, the two devices are cosite, or if the first network device and the second network device are different devices, the two devices are located on different sites (or non-cosite). In the embodiments of this application, whether the first network device and the second network device are physically the same is not limited.

Optionally, logically, if NR DL downlink transmission, NR UL uplink reception, and NR SUL uplink reception all are performed by one network device (that is, the first network device and the second network device are one network device logically), the NR DL downlink transmission, the NR UL uplink reception, and the NR SUL uplink reception are corresponding to one cell.

Physically, the third network device and the second network device in the embodiments of this application are cosite physically, and are different network devices logically.

Access priority information in the embodiments of this application is used to indicate an access priority order of at least one first SUL resource.

A reference signal (RS) in the embodiments of this application may include but is not limited to a CSI-RS and a CRS.

An SUL resource (for example, a first SUL resource, a second SUL resource, and/or a third SUL resource) in the embodiments of this application may be a frequency-domain resource that is shared for uplink transmission on an LTE carrier, or a frequency-domain resource on which no NR downlink transmission is performed and only NR uplink transmission is performed. The frequency-domain resource on which no NR downlink transmission is performed and only NR uplink transmission is performed may also be referred to as an NR SUL resource or an NR SUL carrier.

An uplink resource in the embodiments of this application may be understood as a part of carriers (including a carrier in a non-carrier aggregation (non-CA) scenario and a carrier in a carrier aggregation (CA) scenario) used for uplink transmission, or a part of serving cells (including a serving cell in a CA scenario and a serving cell in a non-CA scenario) used for uplink transmission. The carrier (the serving cell) in the CA scenario may be a primary component carrier (a primary serving cell) or a secondary component carrier (or a secondary serving cell), The uplink resource may also be referred to as an uplink carrier. Correspondingly, a part of a carrier or a serving cell used for downlink transmission may be understood as a downlink resource or a downlink carrier. For example, in a frequency division duplex (FDD) system, on a carrier, a frequency resource used for uplink transmission may be understood as an uplink resource or an uplink carrier, and a frequency resource used for downlink transmission may be understood as a downlink resource or a downlink carrier. For another example, in a time division duplex (TDD) system, on a carrier, a time-domain resource used for uplink transmission may be understood as an uplink resource or an uplink carrier, and a time-domain resource used for downlink transmission may be understood as a downlink resource or a downlink carrier.

Optionally, one NR uplink resource, one NR downlink resource, and one NR SUL resource may be one NR carrier resource (serving cell). Further, one NR uplink resource, one NR downlink resource, and a plurality of NR SUL resources may also be one NR carrier resource (serving cell).

In the wireless communication scenario of LTE-NR cosite deployment shown in FIG. 1A, the NR UE2 randomly selects a target SSB from at least one SSB that is received from the network device 1 and whose downlink measurement value is greater than the SSB selection threshold. If a reference signal received power (RSRP) of the target SSB is greater than or equal to an SUL-RSRP-threshold, an uplink resource on an NR carrier (that is, a non-SUL resource) is selected to perform random access. If the RSRP of the target SSB is less than the SUL-RSRP-threshold, an uplink resource on an LTE carrier (that is, an SUL resource) is selected to perform random access.

In the wireless communication scenario of LTE-NR non-cosite deployment shown in FIG. 1B and/or the wireless communication scenario of LTE-NR cosite deployment shown in FIG. 1C, how the NR terminal selects one resource from an uplink resource on an NR carrier (that is, a non-SUL resource) or an uplink resource on at least one LTE carrier (that is, a plurality of SUL resources) to perform random access to improve random access efficiency of a communications system needs an urgent solution.

According to the random access method and the apparatus provided in the embodiments of this application, a terminal device may determine, based on SUL configuration information sent by a network device, at least one SUL resource and at least one SUL, selection threshold that are corresponding to a first SSB, determine, based on a downlink measurement value of the first SSB and a corresponding SUL selection threshold, a carrier resource used for random access, and perform random access on the determined carrier resource. The carrier resource includes one of the at least one first SUL resource or includes a non-SUL resource corresponding to the first SSB. Therefore, in the embodiments of this application, an appropriate resource can be selected from a non-SUL resource and at least one SUL resource to perform random access, thereby improving random access efficiency of a communications system.

The following uses specific embodiments to detail the technical solutions of this application and how the foregoing technical problem is resolved by using the technical solutions of this application. The following several specific embodiments may be combined with each other, and same or similar concepts or processes may not be described repeatedly in some embodiments.

Figure 2A:
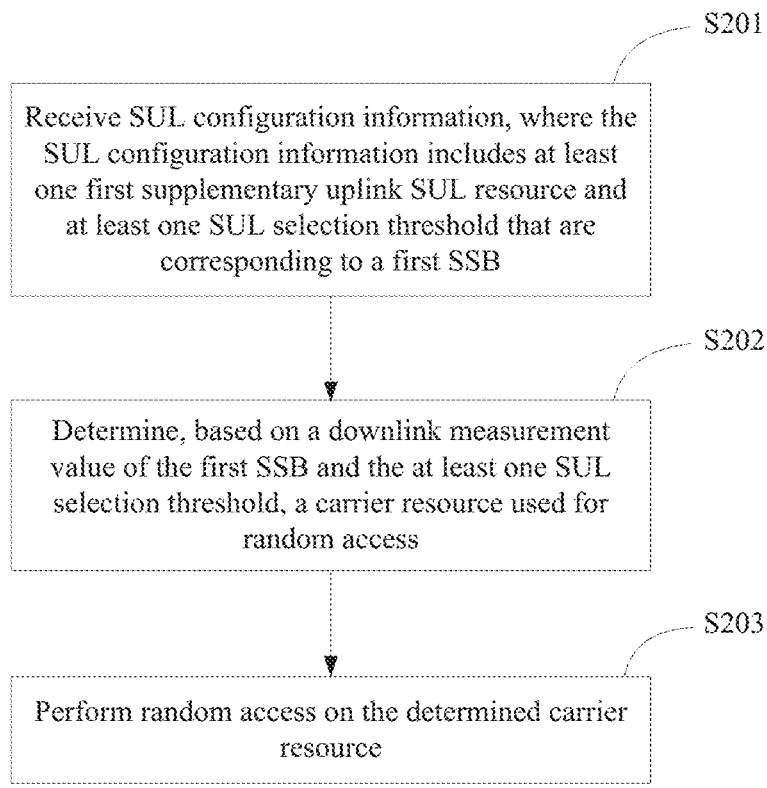
FIG. 2A is a schematic flowchart of a random access method according to an embodiment of this application.
Figure 2B:
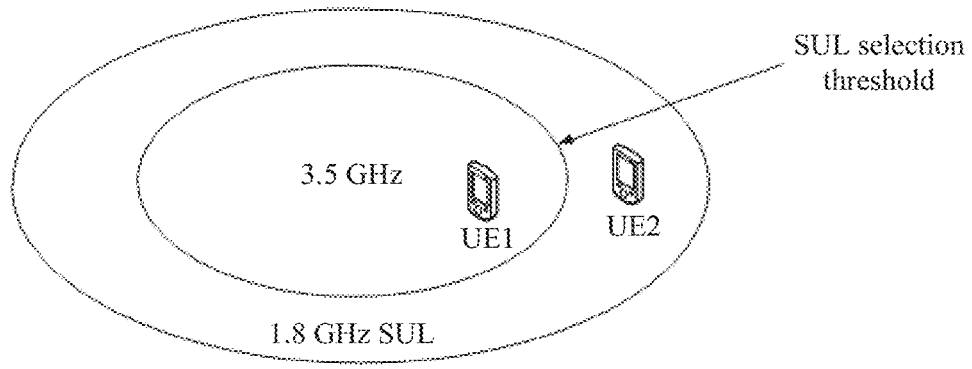
FIG. 2C is a schematic structural diagram 1 in which an SSB is corresponding to a plurality of SUL resources according to an embodiment of this application.
FIG. 2D is a schematic structural diagram 2 in which an SSB is corresponding to a plurality of SUL resources according to an embodiment of this application.
Figure 2C:
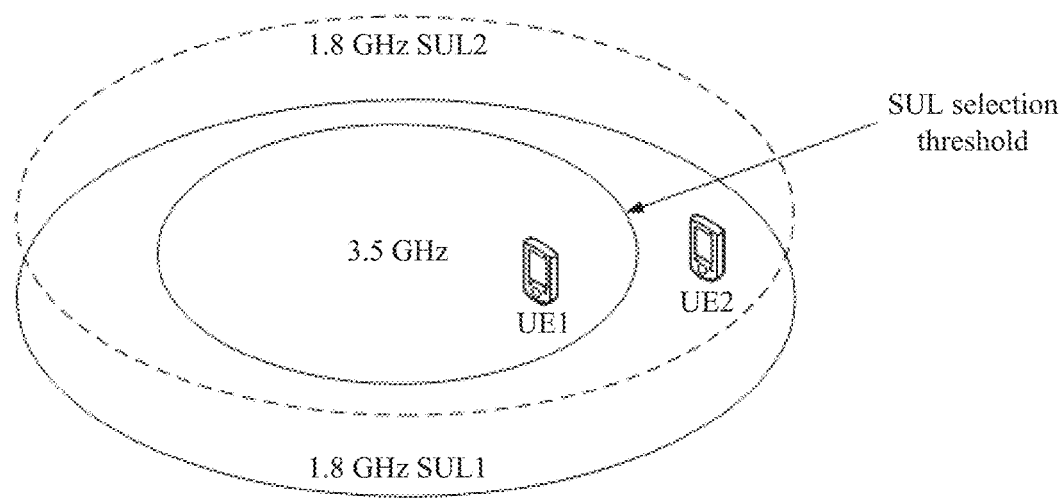
Figure 2D:
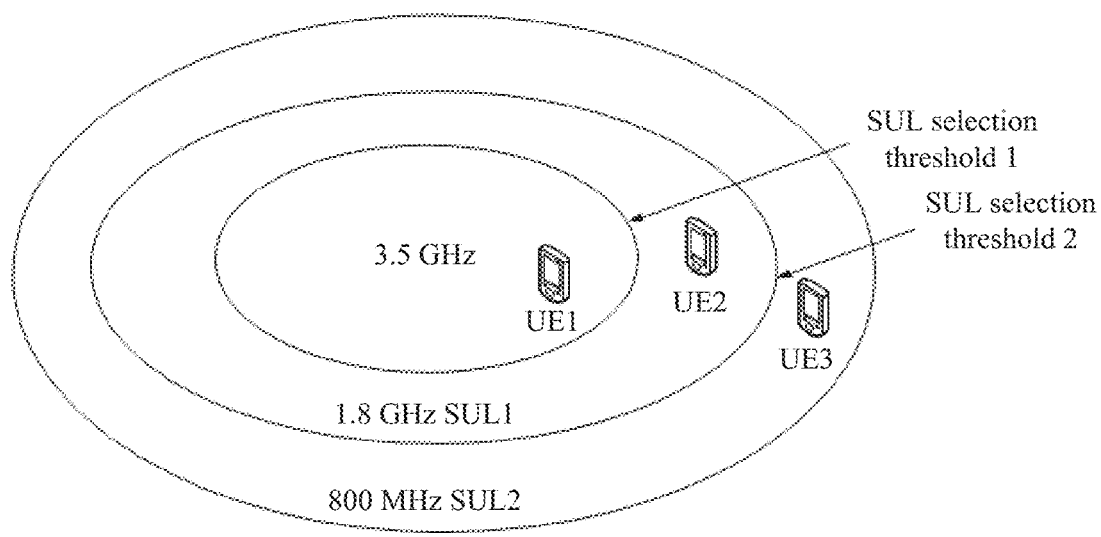

FIG. 2A is a schematic flowchart of a random access method according to an embodiment of this application. FIG. 2B is a schematic structural diagram in which an SSB is corresponding to one SUL resource according to an embodiment of this application, FIG. 2C is a schematic structural diagram 1 in which an SSB is corresponding to a plurality of SUL resources according to an embodiment of this application. FIG. 2D is a schematic structural diagram 2 in which an SSB is corresponding to a plurality of SUL resources according to an embodiment of this application. In the embodiments of this application, description is provided from a terminal device side. As shown in FIG. 2A, the method in this embodiment of this application may include the following steps.

Step S201: Receive SUL configuration information, where the SUL configuration information includes at least one first supplementary uplink SUL resource and at least one SUL selection threshold that are corresponding to a first SSB.

In this step, a terminal device (an NR terminal that supports uplink sharing) receives the SUL configuration information sent by a first network device. Optionally, the SUL configuration information may include the at least one first supplementary uplink SUL resource and the at least one SUL selection threshold that are corresponding to the first SSB. The first SUL resource may be a frequency-domain resource that is shared with an uplink transmission on an LTE carrier, or a frequency-domain resource on which no NR downlink transmission is performed and only NR uplink transmission is performed (therefore, the frequency-domain resource is also used as an NR SUL resource or an NR SUL carrier), The first SUL resource may be used by the terminal device to perform uplink transmission. The SUL selection threshold is used by the terminal device to determine whether to select the first SUL resource for uplink transmission.

For example, the SUL configuration information may include one first SUL resource and one SUL selection threshold that are corresponding to the first SSB; the SUL configuration information may include a plurality of first SUL resources and one SUL selection threshold (or a plurality of same SUL selection thresholds) that are corresponding to the first SSB; or the SUL configuration information may include a plurality of first SUL resources and a plurality of SUL selection thresholds that are corresponding to the first SSB (where the plurality of first SUL resources are corresponding to different SUL selection thresholds, or some of the plurality of the first SUL resources may be corresponding to a same SUL selection threshold).

Certainly, the SUL configuration information may further include other information (for example, configuration information of a downlink reference signal corresponding to the at least one first SUL resource, access priority information corresponding to the at least one first SUL resource, and/or uplink resource configuration information of the at least one first SUL resource). This is not limited in the embodiments of this application. Optionally, the uplink resource configuration information of the first SUL resource may include but is not limited to frequency-domain information and common configuration information of the first SUL resource. Specifically, for the frequency-domain information of the first SUL resource, reference may be made to related content of the frequency-domain information of the uplink resource, and details are not described herein again; and/or for the common configuration information of the first SUL resource, reference may be made to related content of the common configuration information of the uplink resource, and details are not described herein again.

Optionally, the SUL configuration information may further include an SUL resource and an SUL selection threshold that are corresponding to another SSB, or if the SUL configuration information includes only the SUL resource and the SUL selection threshold that are corresponding to the first SSB, the terminal device may further receive SUL configuration information corresponding to another SSB that is sent by the first network device or another network device. This is not limited in the embodiments of this application.

Optionally, the SUL configuration information in the embodiments of this application may be carried in a SIB or RMSI, or certainly, may be carried in another message. This is not limited in the embodiments of this application.

It should be noted that the SUL configuration information in the embodiments of this application may also be referred to as resource configuration information or another name. This is not limited in the embodiments of this application.

It should be noted that, if the SUL selection threshold corresponding to the first SSB may be preconfigured, or if another message carries a cell-level SUL selection threshold (that is, a plurality of SSBs of a cell use the SUL selection threshold), the SUL configuration information in the embodiments of this application may not include the at least one SUL selection threshold corresponding to the first SSB, or the SUL configuration information in the embodiments of this application may still include the at least one SUL selection threshold corresponding to the first SSB, but an SUL selection threshold carried in the SUL configuration information prevails.

This embodiment describes possible implementations of the SUL configuration information when the SUL configuration information includes the at least one first SUL resource corresponding to the first SSB.

In a possible implementation, the SUL configuration information may include an identifier of the first SSB and an identifier of the at least one first SUL resource corresponding to the first SSB. Optionally, the identifier may be index information, or may be other indication information that may be used to uniquely indicate an SSB and/or the first SUL resource (for example, frequency channel number information of the first SUL resource and/or the configuration information of the downlink reference signal corresponding to the first SUL resource, where the downlink reference signal configuration information may include but is not limited to at least one of the following: frequency channel number information of a carrier (or a downlink resource) on which the downlink reference signal is located, bandwidth information, a. POD of the carrier on which the downlink reference signal is located, transmit power information of the downlink reference signal, and information about a path loss adjustment value caused by a frequency-domain deviation between the downlink reference signal and an SUL resource; and the downlink reference signal may also be understood as an LTE downlink carrier corresponding to the first SUL resource, and is used to obtain a transmit power of an NR terminal device on an SUL resource). This is not limited in the embodiments of this application.

If the first SSB is corresponding to an index of one first SUL resource, optionally, the SUL configuration information may further include an SUL selection threshold. If the SUL configuration information does not include the SUL selection threshold, the SUL selection threshold is preconfigured, or another message carries a cell-level SUL selection threshold (in other words, a plurality of SSBs of a cell use the SUL selection threshold). If an SUL message includes the SUL selection threshold, the first SSB uses the SUL selection threshold carried in the SUL configuration information.

If the first SSB is corresponding to indexes of a plurality of first SUL resources, optionally, the SUL configuration information may further include at least one SUL selection threshold corresponding to the first SSB. For example, if the SUL configuration information includes one SUL selection threshold corresponding to the first SSB, it indicates that a plurality of first SUL resources corresponding to the first SSB share one SUL selection threshold. If the SUL configuration information includes a plurality of SUL selection thresholds corresponding to the first SSB, the at least one first SUL resource corresponding to the plurality of SUL selection thresholds needs to be indicated, or one SUL selection threshold corresponding to the plurality of the first SUL resources is indicated. If SUL selection thresholds corresponding to the at least one first SUL resource are different, one first SUL resource is corresponding to one SUL selection threshold; or if SUL selection thresholds corresponding to the plurality of the first SUL resources are the same, the plurality of first SUL resources share one SUL selection threshold.

If the first SSB is corresponding to indexes of a plurality of first SUL resources, optionally, the SUL configuration information may further include access priority information. For example, an order of the indexes of the plurality of first SUL resources corresponding to the first SSB in the SUL configuration information may be used to indicate an access priority order of the plurality of first SUL resources corresponding to the first SSB (for example, if the SUL configuration information sequentially includes an index of an SUL resource 3, an index of an SUL resource 1, and an index of an SUL resource 2, an access priority of the SUL resource 3 is higher than an access priority of the SUL resource 1, and the access priority of the SUL resource 1 is higher than an access priority of the SUL resource 2). Certainly, the SUL configuration information may further include access priority information in another form (used to indicate an access priority order of the plurality of first SUL resources corresponding to the first SSB). This is not limited in the embodiments of this application.

In another possible implementation, the SUL configuration information may include an identifier of the at least one first SUL resource and an identifier of the first SSB corresponding to the at least one first SUL resource.

If the SUL configuration information includes an identifier of one first SUL resource and an identifier of a first SSB corresponding to the first SUL resource, optionally, the SUL configuration information may further include one SUL selection threshold. If the SUL configuration information does not include the SUL selection threshold, the SUL selection threshold is preconfigured, or another message carries a cell-level SUL selection threshold (in other words, a plurality of SUL resources of a cell use the SUL selection threshold). If the SUL configuration information includes the SUL selection threshold, the first SUL resource uses the SUL selection threshold carried in the SUL configuration information.

If the SUL configuration information includes identifiers of a plurality of first SUL resources and an identifier of a first SSB corresponding to the plurality of first SUL resources, optionally, the SUL configuration information may further include at least one SUL selection threshold. For example, if the SUL configuration information includes one SUL selection threshold, it indicates that the plurality of first SUL resources share one SUL selection threshold. If the SUL configuration information includes a plurality of SUL selection thresholds, the at least one first SUL resource corresponding to the plurality of SUL selection thresholds needs to be indicated, or one SUL selection threshold corresponding to the plurality of the first SUL resources is indicated. If SUL selection thresholds corresponding to the plurality of first SUL resources are different, one first SUL resource is corresponding to one SUL selection threshold. If the SUL selection thresholds corresponding to the plurality of first SUL resources are the same, the plurality of first SUL resources share one SUL selection threshold. If SUL selection thresholds corresponding to at least two of the plurality of first SUL resources are the same, the at least two first SUL resources share one SUL selection threshold.

If the SUL configuration information includes identifiers of a plurality of first SUL, resources, and an identifier of a first SSB corresponding to the plurality of first SUL resources, optionally, the SUL configuration information may further include access priority information (used to indicate an access priority order of the plurality of first SUL resources corresponding to the first SSB).

This embodiment describes possible implementations of the SUL configuration information when the SUL configuration information includes at least one SUL resource corresponding to a plurality of SSBs.

In a possible implementation, the SUL configuration information may include identifiers of at least two SSBs and an identifier of at least one SUL resource corresponding to the at least two SSBs. Optionally, the identifier may be index information, or may be other indication information that may be used to uniquely indicate an SSB and/or the first SUL resource (for example, frequency channel number information of the first SUL resource and/or the configuration information of the downlink reference signal corresponding to the first SUL resource, where the downlink reference signal configuration information may include but is not limited to at least one of the following: frequency channel number information of a carrier (or a resource) on which the downlink reference signal is located, bandwidth information, a PCID of the carrier on which the downlink reference signal is located, transmit power information of the downlink reference signal, and information about a path loss adjustment value caused by a frequency-domain deviation between the downlink reference signal and an SUL resource; and the downlink reference signal may also be understood as an LTE downlink carrier on a frequency band on which the first SUL resource is located, that is, frequency channel number information of an LTE carrier, bandwidth information, a PCID, and information about a path loss adjustment value caused by a frequency-domain deviation between the LTE carrier and an SUL resource). This is not limited in the embodiments of this application.

If an SSB0 (any SSB of the plurality of SSBs included in the SUL configuration information) is corresponding to an index of one SUL resource, optionally, the SUL configuration information may further include an SUL selection threshold corresponding to the SSB0. If the SUL configuration information does not include the SUL selection threshold corresponding to the SSB0, the SUL selection threshold is preconfigured, or another message carries a cell-level SUL selection threshold (in other words, a plurality of SSBs of a cell use the SUL selection threshold). If an SUL message includes the SUL selection threshold corresponding to the SSB0, the SSB0 uses the SUL selection threshold carried in the SUL configuration information.

If the SSB0 is corresponding to indexes of a plurality of SUL resources, optionally, the SUL configuration information may further include at least one SUL selection threshold corresponding to the SSB0. For example, if the SUL configuration information includes one SUL selection threshold corresponding to the SSB0, it indicates that a plurality of SUL resources corresponding to the SSB0 share one SUL selection threshold. If the SUL configuration information includes a plurality of SUL selection thresholds corresponding to the SSB0, the at least one first SUL resource corresponding to the plurality of SUL selection thresholds needs to be indicated, or one SUL selection threshold corresponding to the plurality of the SUL resources is indicated. If SUL selection thresholds corresponding to a plurality of SUL resources are different, one SUL resource is corresponding to one SUL selection threshold; or if SUL selection thresholds corresponding to the plurality of the SUL resources are the same, the plurality of SUL resources share one SUL selection threshold.

If the SSB0 is corresponding to indexes of a plurality of SUL resources, optionally, the SUL configuration information may further include access priority information (used to indicate an access priority order of the plurality of SUL resources corresponding to the SSB0). For example, an order of the indexes of the plurality of SUL resources corresponding to the SSB0 in the SUL configuration information may be used to indicate an access priority order of the plurality of SUL resources corresponding to the SSB0. Certainly, the SUL configuration information may further include access priority indication information in another form. This is not limited in the embodiments of this application.

In another possible implementation, the SUL configuration information may include an identifier of the at least one SUL resource and an identifier of the at least one SSB corresponding to the at least one SUL resource.

If an SUL0 resource (any SUL resource of the plurality of SUL resources included in the SUL configuration information) is corresponding to an index of one SSB, optionally, the SUL configuration information may further include an SUL selection threshold corresponding to one SUL0 resource.

If the SUL configuration information does not include the SUL selection threshold corresponding to the SUL0 resource, the SUL selection threshold is preconfigured, or another message carries an SUL selection threshold (in other words, the SUL0 resource uses the SUL selection threshold). If an SUL message includes the SUL selection threshold corresponding to the SUL0 resource, the SUL0 resource uses the SUL selection threshold carried in the SUL configuration information.

If the SUL0 resource is corresponding to indexes of a plurality of SSBs, optionally, the SUL, configuration information may further include at least one SUL selection threshold corresponding to the SUL0 resource. For example, if the SUL configuration information includes one SUL selection threshold corresponding to the SUL0 resource, it indicates that the plurality of SSBs share one SUL selection threshold. If the SUL, configuration information includes a plurality of SUL selection thresholds corresponding to the SUL0 resource. SSBs corresponding to the plurality of SUL selection thresholds need to be indicated, or the SUL selection thresholds corresponding to the plurality of SSBs need to be separately indicated. If SUL selection thresholds corresponding to the plurality of SSBs are different, one SSB is corresponding to one SUL selection threshold; or if SUL selection thresholds corresponding to the plurality of SSBs are the same, the plurality of SSBs share one SUL selection threshold.

If the SUL configuration information includes identifiers of a plurality of SUL resources and an index of one SSB corresponding to the plurality of SUL resources, optionally, the SUL configuration information may further include at least one SUL selection threshold. For example, if the SUL configuration information includes one SUL selection threshold, it indicates that the plurality of SUL resources share one SUL selection threshold. If the SUL configuration information includes a plurality of SUL selection thresholds, the at least one SUL resource corresponding to the plurality of SUL selection thresholds needs to be indicated, or one SUL selection threshold corresponding to the plurality of the SUL resources is indicated. If SUL selection thresholds corresponding to a plurality of SUL resources are different, one SUL resource is corresponding to one SUL selection threshold; or if SUL selection thresholds corresponding to the plurality of the SUL resources are the same, the plurality of SUL resources share one SUL selection threshold.

If the SUL configuration information includes identifiers of a plurality of SUL resources, and an index of one SSB corresponding to the plurality of SUL resources, optionally, the SUL configuration information may further include access priority information (used to indicate an access priority order of the plurality of SUL resources).

In another possible implementation, the SUL configuration information may include an identifier of one SUL resource and at least two SUL selection thresholds. Optionally, the SUL resource may be corresponding to identifiers of a plurality of SSBs.

To further indicate SUL selection thresholds corresponding to different SSBs, the SUL configuration information may further include identifiers of a plurality of SSBs and SUL selection thresholds corresponding to the SSBs. For example, a horizontal beam may be corresponding to one SUL selection threshold, and a vertical beam may be corresponding to one SUL selection threshold, so that terminal devices on different floors can select appropriate uplink carriers based on different SUL selection thresholds. For example, for a terminal device on a higher floor, when the terminal device selects an uplink carrier based on the SUL selection threshold corresponding to the horizontal beam, the terminal device fails in RACH access performed on an SUL resource. Therefore, the SUL selection threshold corresponding to the vertical beam may be set to be less than the SUL selection threshold corresponding to the horizontal beam, so that the terminal device selects, based on the SUL selection threshold corresponding to the vertical beam, to initiate RACH access on a non-SUL resource.

Certainly, the SUL configuration information may be alternatively implemented in another possible implementation. This is not limited in the embodiments of this application.

Step S202: Determine, based on a downlink measurement value of the first SSB and the at least one SUL selection threshold, a carrier resource used for random access.

In this step, the terminal device determines, based on the downlink measurement value of the first SSB and the at least one SUL selection threshold, the carrier resource used for random access, where the carrier resource includes one of the at least one first SUL resource corresponding to the first SSB or includes a non-SUL resource corresponding to the first SSB.

In a possible implementation, if the SUL configuration information includes one first SUL resource corresponding to the first SSB and one SUL selection threshold corresponding to the first SSB (or referred to as an SUL selection threshold corresponding to the first SUL resource), the carrier resource used for random access is determined based on the downlink measurement value of the first SSB and the SUL selection threshold corresponding to the first SSB.

Optionally, as shown in FIG. 2B, if the downlink measurement value of the first SSB is greater than or equal to the SUL selection threshold corresponding to the first SSB (for example, an SUL selection threshold in FIG. 2B, where the SUL selection threshold is greater than a camp-on threshold), the terminal device (for example, UE1 in FIG. 2B) determines that the carrier resource used for random access includes the non-SUL resource (for example, a 3.5 GHz carrier resource shown in FIG. 2B); or if the downlink measurement value of the first SSB is less than the SUL selection threshold corresponding to the first SSB (for example, an SUL selection threshold in FIG. 2B), the terminal device (for example, UE2 in FIG. 2B) determines that the carrier resource used for random access includes the one first SUL resource corresponding to the first SSB (for example, a 1.8 GHz SUL resource shown in FIG. 2B).

In another possible implementation, if the SUL configuration information includes N1 first SUL resources corresponding to the first SSB and one SUL selection threshold corresponding to the first SSB (or referred to as an SUL selection threshold corresponding to the N1 first SUL resources), where N1 is an integer greater than or equal to 2, the carrier resource used for random access is determined based on the downlink measurement value of the first SSB and the SUL, selection threshold corresponding to the first SSB.

Optionally, if the downlink measurement value of the first SSB is greater than or equal to the SUL selection threshold corresponding to the first SSB (for example, an SUL selection threshold in FIG. 2C, where the SUL selection threshold is greater than a camp-on threshold), the terminal device (for example, UE1 in FIG. 2C) determines that the carrier resource used for random access includes a non-SUL resource (for example, a 3.5 GHz carrier resource shown in FIG. 2C); or if the downlink measurement value of the first SSB is less than the SUL selection threshold corresponding to the first SSB (for example, an SUL selection threshold in FIG. 2C), the terminal device (for example, UE2 in FIG. 2C) determines that the carrier resource used for random access includes one (for example, a 1.8 GHz SUL1 resource or a 1.8 GHz SUL2 resource shown in FIG. 2C) of the N1 first SUL resources. The following embodiment of this application describes a possible implementation in which the terminal device determines the carrier-resource used for random access from the N1 first SUL resources.

For example, the terminal device may determine, based on the access priority information, that the carrier resource used for random access includes a second SUL resource (for example, the 1.8 GHz SUL1 resource in FIG. 2C) in the N1 first SUL resources. The access priority information is used to indicate an access priority order of the N1 first SUL resources, and an access priority of the second SUL resource is higher than a priority of a first SUL resource (for example, the 1.8 GHz SUL2 resource in FIG. 2C) of the N1 first SUL resources other than the second SUL resource. For example, alternatively, the terminal device may randomly select one SUL resource from the N1 first SUL resources as the carrier resource used for random access. For example, if the downlink measurement value of the first SSB is less than the SUL selection threshold corresponding to the first SSB (for example, the SUL selection threshold in FIG. 2C), the terminal device may randomly select the 1.8 GHz SUL1 resource or the 1.8 GHz SUL2 resource. For example, the terminal device may alternatively select, based on a capability of the terminal device (a carrier resource supported by the terminal device), one SUL resource from the N1 first SUL resources as the carrier resource used for random access.

Certainly, the terminal device may alternatively determine the carrier resource used for random access from the N1 first SUL resources in another manner. This is not limited in the embodiments of this application.

In another possible implementation, if the SUL configuration information includes N2 first SUL resources corresponding to the first SSB and N3 SUL selection thresholds corresponding to the first SSB, where N2 and N3 are integers greater than or equal to 2 (optionally, N2 is greater than or equal to N3), and one of the N2 first SUL resources is corresponding to one of the N3 SUL selection thresholds (optionally, one of the N2 first SUL resources may be corresponding to one different SUL selection threshold of the N3 SUL selection thresholds, or some of the N2 first SUL resources may be corresponding to one of the N3 SUL selection thresholds), the terminal device may determine a third SUL resource from the N2 first SUL resources based on the access priority information, where the access priority information is used to indicate an access priority order of the N2 first SUL resources, and an access priority of the third SUL resource is higher than a priority of an SUL resource of the N2 first SUL resources other than the third SUL resource. Alternatively, the terminal device may select, based on a capability of the terminal device (a carrier resource supported by the terminal device), one SUL resource from the N2 first SUL resources as the third SUL resource. Certainly, the terminal device may alternatively select the third SUL resource from the N2 first SUL resources in another manner. This is not limited in the embodiments of this application.

Further, the terminal device determines, based on the downlink measurement value of the first SSB and an SUL selection threshold corresponding to the third SUL resource, the carrier resource used for random access, where the carrier resource includes the third SUL resource or includes the non-SUL resource corresponding to the first SSB. Optionally, if the downlink measurement value of the first SSB is greater than or equal to the SUL selection threshold corresponding to the third SUL resource, the carrier resource used for random access includes the non-SUL resource: or if the downlink measurement value of the first SSB is less than the SUL selection threshold corresponding to the third SUL resource, the carrier resource used for random access includes the third. SUL resource.

In another possible implementation, if the SUL configuration information includes N4 first SUL resources corresponding to the first SSB and N4 SUL selection thresholds corresponding to the first SSB, where N4 is an integer greater than or equal to 2, and one of the N4 first SUL resources is corresponding to one of the N4 SUL selection thresholds (in other words, one of the N4 first SUL resources may be corresponding to one of the N4 SUL selection thresholds, where SUL selection thresholds corresponding to different first SUL resources may be the same or may be different, and this is not limited in this application), the terminal device may determine, based on an SUL selection threshold of the N4 SUL selection thresholds that is closest to the downlink measurement value of the first SSB, the carrier resource used for random access.

Optionally, if the downlink measurement value of the first SSB is less than an SUL selection threshold corresponding to a fourth SUL resource and is greater than or equal to a selection threshold corresponding to a fifth SUL resource, the carrier resource used for random access includes the fourth SUL resource, where the fourth SUL resource and the fifth SUL resource are included in the N4 first SUL resources (optionally, the SUL selection threshold corresponding to the fourth SUL resource or the SUL selection threshold corresponding to the fifth SUL resource is any value between a smallest value and a largest value of the N4 SUL selection thresholds);

if the downlink measurement value of the first SSB is less than an SUL selection threshold corresponding to a sixth SUL resource, the carrier resource used for random access includes the sixth SUL resource, where the SUL selection threshold corresponding to the sixth SUL resource is a smallest value of the N4 SUL selection thresholds; or if the downlink measurement value of the first SSB is greater than or equal to an SUL selection threshold corresponding to a seventh SUL resource, the carrier resource used for random access includes the non-SUL resource, where the SUL selection threshold corresponding to the seventh SUL resource is a largest value of the N4 SUL selection thresholds.

For example, "the terminal device may determine, based on an SUL selection threshold of the N4 SUL selection thresholds that is closest to the downlink measurement value of the first SSB, the carrier resource used for random access" may be alternatively described as follows:

The terminal device may group the N4 SUL selection thresholds into at least three SUL selection threshold intervals based on an order of the N4 SUL selection thresholds. For example, it is assumed that N4 is equal to 3, that an SUL selection threshold 1 is greater than an SUL selection threshold 2, and that the SUL selection threshold 2 is greater than an SUL selection threshold 3 (where one SUL selection threshold is corresponding to one of three first SUL resources). In this case, the terminal device may group the three SUL selection thresholds into (smaller value, SUL selection threshold 3), [SUL selection threshold 3, SUL selection threshold 2), [SUL selection threshold 2, SUL selection threshold 1), and [SUL selection threshold 1, larger value).

Further, the carrier resource used for initiating random access is determined based on a target SUL selection threshold interval to which the downlink measurement value of the first SSB belongs. Optionally, if an upper limit of the target SUL selection threshold interval belongs to any of the N4 SUL selection thresholds, it is determined that the carrier resource used for random access includes a first SUL resource corresponding to the upper limit. For example, assuming that the target SUL selection threshold interval is [SUL selection threshold 2, SUL selection threshold 1), it is determined that the carrier resource used for random access includes the first SUL resource corresponding to the upper limit (for example, the SUL selection threshold 1). Alternatively, if the target SUL selection threshold interval has no upper limit, it is determined that the carrier resource used for initiating random access includes a non-SUL resource. For example, assuming that the target SUL selection threshold interval is [SUL selection threshold 1, larger value), it is determined that the carrier resource used for initiating random access includes the non-SUL resource.

Optionally, if the SUL configuration information includes N4 first SUL resources corresponding to the first SSB and N4 SUL selection thresholds corresponding to the first SSB, where N4 is an integer greater than or equal to 2, and one of the N4 first SUL resources is corresponding to one of the N4 SUL selection thresholds, the terminal device may further determine, based on a capability of the terminal device (a carrier resource supported by the terminal device) and an SUL selection threshold of some or all of the N4 SUL selection thresholds that is closest to the downlink measurement value of the first SSB, the carrier resource used for random access.

As shown in FIG. 2D, it is assumed that N4 is equal to 2, and that an SUL selection threshold 1 (the SUL selection threshold 1 is corresponding to a 1.8 GHz SUL1 resource) is greater than a SUL selection threshold 2 (the SUL selection threshold 2 is corresponding to an 800 MHz SUL2 resource, and the SUL selection threshold 2 is greater than a camp-on threshold), In this case, the terminal device may group the two SUL selection thresholds into (smaller value (that is, a value less than the SUL selection threshold 2), SUL selection threshold 2), [SUL, selection threshold 2, SUL selection threshold 1), and [SUL selection threshold 1, larger value (that is, a value greater than the SUL selection threshold 1)).

Optionally, (1) if the terminal device supports the 1.8 GHz SUL1 resource and the 800 MHz SUL2 resource, the terminal device determines, depending on whether the downlink measurement value of the first SSB belongs to (smaller value, SUL selection threshold [SUL selection threshold 2, SUL selection threshold 1), or [SUL selection threshold 1, larger value), the carrier resource for initiating random access. If the downlink measurement value of the first SSB belongs to (smaller value, SUL selection threshold 2), the carrier resource for initiating random access by the terminal device (for example, UE3 shown in FIG. 2D) includes the 800 MHz SUL2 resource corresponding to the SUL selection threshold 2. If the downlink measurement value of the first SSB belongs to [SUL selection threshold 2, SUL selection threshold 1), the carrier resource for initiating random access by the terminal device (for example, UE2 shown in FIG. 2D) includes the 1.8 GHz SUL1 resource. If the downlink measurement value of the first SSB belongs to [SUL selection threshold 1, larger value), the carrier resource for initiating random access by the terminal device (for example, UE1 shown in FIG. 2D) includes a non-SUL resource a 3.5 GHz resource).

(2) If the terminal device supports the 1.8 GHz SUL1 resource, but does not support the 800 MHz SUL2 resource, the terminal device determines, depending on whether the downlink measurement value of the first SSB belongs to [SUL selection threshold 2, SUL selection threshold 1) or [SUL selection threshold 1, larger value), the carrier resource for initiating random access. If the downlink measurement value of the first SSB belongs to [SUL selection threshold 2, SUL selection threshold 1), the carrier resource for initiating random access by the terminal device (for example, the UE2 shown in FIG. 2D) includes the 1.8 GHz SUL1 resource. If the downlink measurement value of the first SSB belongs to [SUL selection threshold 1, larger value), the carrier resource for initiating random access by the terminal device (for example, the UE1 shown in FIG. 2D) includes a non-SUL resource (for example, the 3.5 GHz resource).

(3) If the terminal device supports the 800 MHz SUL2 resource, but does not support the 1.8 GHz SUL1 resource, the terminal device determines, depending on whether the downlink measurement value of the first SSB belongs to (smaller value, SUL selection threshold 2) or [SUL selection threshold 2, larger value), the carrier resource for initiating random access. If the downlink measurement value of the first SSB belongs to (smaller value, SUL selection threshold 2), the carrier resource for initiating random access by the terminal device (for example, the UE3 shown in FIG. 2D) includes the 800 MHz SUL2 resource corresponding to the SUL selection threshold 2. If the downlink measurement value of the first SSB belongs to [SUL selection threshold 2, larger value), the carrier resource for initiating random access by the terminal device (for example, the UE1 shown in FIG. 2D) includes a non-SUL resource (for example, the 3.5 GHz resource).

Certainly, the terminal device may determine, based on the downlink measurement value of the first SSB and the at least one SUL selection threshold, the carrier resource used for random access in another possible implementation. This is not limited in the embodiments of this application.

Step S203: Perform random access on the determined carrier resource.

In this step, the terminal device performs random access on the determined carrier resource. For a specific random access procedure, refer to related content described in the foregoing embodiments of this application. Details are not described again in the embodiments of this application.

In the embodiments of this application, the SUL configuration information is received, Where the SUL configuration information includes the at least one first supplementary uplink SUL resource and the at least one SUL selection threshold that are corresponding to the first SSB. Further, the carrier resource used for random access may be determined based on the downlink measurement value of the first SSB and the at least one SUL selection threshold, and random access is performed on the determined carrier resource, where the carrier resource includes one of the at least one first SUL resource or includes the non-SUL resource corresponding to the first SSB. It can be learned that, in the embodiments of this application, an appropriate resource can be selected from the non-SUL resource and the at least one SUL resource to perform random access, thereby improving random access efficiency of a communications system of LTE-NR cosite deployment and/or LTE-NR non-cosite deployment.

In a wireless communications system, power control is performed to make powers of signals from different terminal devices to a network device basically the same, so as to reduce mutual interference and improve system performance. For example, it is assumed that, when the terminal device sends a PUSCH in a cell c or in a subframe i on a carrier c, the terminal device determines a transmit power of the PUSCH (that is, a transmit power of an uplink signal) according to the following formula:

$$P_{PUSCH,c}(i) = \min\left\{\begin{array}{l} P_{CMAX,c}(i) \\ 10\log_{10}(M_{PUSCH,c}(i)) + P_{O\_PUSCH,c} + \alpha_c \cdot PL_c + \Delta_{TF,c}(i) + f_c(i) \end{array}\right\}$$

[dBm], where $P_{CMAX,c}(i)$ represents a maximum transmit power of the terminal device in the cell c or in the subframe i on the carrier c;

$M_{PUSCH,c}(i)$ represents a quantity of RBs, in the cell c or in the subframe i on the carrier, that are allocated by the network device to the terminal device;

$P_{O\_PUSCH,c}$ represents an expected receive power of the network device, where $P_{O\_PUSCH,c} = P_{O\_UE\_PUSCH,c} + P_{O\_NOMINAL\_PUSCH,c}$, $P_{O\_NOMINAL\_PUSCH,c}$ represents an expected PLISCH transmit power of the network device in a case of normal demodulation, and $P_{O\_PUSCH,c}$ represents a power offset of the terminal device relative to $P_{O\_NOMINAL\_PUSCH,c}$, where $P_{O\_NOMINAL\_PUSCH,c}$ and $P_{O\_UE\_PUSCH,c}$ may be configured by the network device for the terminal device by using signaling or may be preconfigured, which is not limited in this application;

$PL_c$ represents a downlink path loss estimation value that is estimated by the terminal device based on a reference signal on a downlink carrier, and is used to determine an uplink path loss estimation value in uplink carrier (the uplink carrier may be an SUL resource or a non-SUL resource) transmission;

$\alpha_c$ represents a path loss compensation factor configured by using higher layer signaling, and a value of $\alpha_c$ ranges from 0 to 1 (including 0 and 1);

$\Delta_{TF,c}(i)$ represents a power offset value of different modulation and coding scheme (MCS) formats relative to a reference MCS format; and $f_c(i)$ represents a PUSCH transmit power adjustment value of the terminal device, and is obtained by mapping transmit power control (TPC) information in a PDCCH.

Considering that $PL_c$ is related to a distance d between the network device and the terminal device and a carrier frequency fc for performing data transmission, generally, an uplink frequency is relatively close to a downlink frequency, and an uplink path loss may be approximately equal to a downlink path loss. Therefore, the terminal device may estimate $PL_c$ based on a transmit power of a downlink reference signal (for example, a CRS, an SSB, or a CSI-RS) broadcast by the network device and a receive power of the terminal device side.

In the wireless communication scenario of LTE-NR cosite deployment shown in FIG. 1A, if the NR UE2 uses a downlink resource on an NR carrier to perform downlink transmission with the network device 1, and uses an SUL resource (optionally, the SUL resource may be a frequency-domain resource that is shared with uplink transmission on an LTE carrier, and the SUL resource is used only for uplink transmission in NR) to perform uplink transmission with the network device 1. Although an uplink distance from the NR UE2 to the network device 1 is equal to a downlink distance from the network device 1 to the NR UE2, a gap between an uplink frequency and a downlink frequency is relatively large. Therefore, an uplink path loss is unequal to a downlink path loss (optionally, a difference between the uplink path loss and the downlink path loss is a value related to a ratio of an LTE carrier frequency to an NR carrier frequency, for example, 20 log 10 (LTE carrier frequency/NR carder frequency)). Optionally, a difference between the uplink path loss and the downlink path loss is compensated for by configuring $P_{O\_UE\_PUSCH,c}$ in $P_{O\_PUSCH,c}$ (for example, a difference between $P_{O\_UE\_PUSCH,c}$ of an SUL resource and $P_{O\_UE\_PUSCH}$ of a non-SUL resource is 20 log 10 (LTE carrier frequency/NR carrier frequency)), so that the terminal device can still use $PL_c$ to calculate a transmit power of the SUL resource.

In the wireless communication scenario of LTE-NR non-cosite deployment shown in FIG. 1B, if the NR UE4 uses a downlink resource on an NR carrier to perform downlink transmission with the network device 2, and uses an SUL resource (optionally, the SUL resource may share a same frequency-domain resource with an uplink resource on an LTE carrier, and the SUL resource is used to perform only uplink transmission in NR) to perform uplink transmission with the network device 3, an uplink distance from the NR UE4 to the network device 2 is unequal to a downlink distance from the NR UE4 to the network device 3, and a gap between an uplink frequency and a downlink frequency is relatively large. It can be learned that the terminal device cannot accurately estimate an uplink path loss between the NR UE4 and the network device 3 based on $PL_c$, between the network device 2 and the NR UE4. Therefore, how the terminal device accurately estimates the uplink path loss between the NR UE4 and the network device 3 (or how the terminal device estimates an uplink path loss when using a non-cosite SUL resource, so as to determine a transmit power of an uplink signal) needs an urgent solution.

Figure 3:
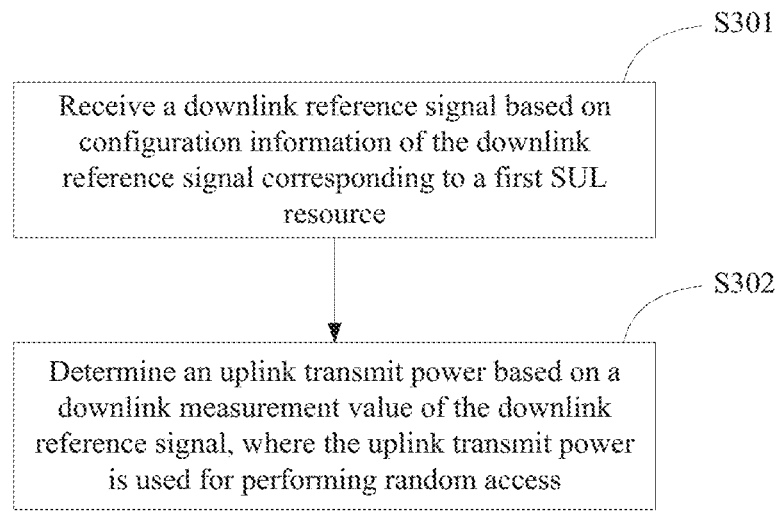
FIG. 3 is a schematic flowchart of a random access method according to another embodiment of this application.

FIG. 3 is a schematic flowchart of a random access method according to another embodiment of this application. Based on the foregoing embodiment, if the carrier resource used for random access determined in step S202 includes one of the at least one first SUL resource corresponding to the first SSB, in the embodiments of this application, a possible implementation of determining an uplink transmit power for performing random access based on a carrier resource is described. The method may be further used for determining an uplink transmit power of the terminal device for transmitting another uplink signal or an uplink channel on the first SUL resource. As shown in FIG. 3, the method in the embodiments of this application may include the following steps.

Step S301: Receive a downlink reference signal based on configuration information of the downlink reference signal corresponding to a first SUL resource.

In this step, a terminal device (for example, the NR UE4 shown in FIG. 1B) may receive, on a corresponding downlink resource based on the configuration information of the downlink reference signal corresponding to the first SUL resource, a downlink reference signal that is sent by a third network device (for example, the network device 3 shown in FIG. 1B). The configuration information of the downlink reference signal may be used to indicate at least one of the following: location information of a downlink resource of the downlink reference signal, transmit power information corresponding to the downlink reference signal, PCID information corresponding to a carrier on which the downlink reference signal is located, and information about a path loss adjustment value caused by a frequency-domain deviation between the downlink reference signal and an SUL resource.

Step S302: Determine an uplink transmit power based on a downlink measurement value of the downlink reference signal, where the uplink transmit power is used for performing random access.

In this step, for example, the terminal device may determine downlink path loss information (for example, information about a downlink path loss from the network device 3 to the NR. UE4 shown in FIG. 13) based on the downlink measurement value of the downlink reference signal and the transmit power information of the downlink reference signal. Considering that a downlink distance from the network device 3 to the NR UE4 is approximately equal to an uplink distance from the NR UE4 to the network device 3, and that a downlink frequency of the network device 3 is relatively close to an uplink frequency of the NR UE4 or the downlink frequency and the uplink frequency are at one frequency band, a downlink path loss from the network device 3 to the NR UE4 may be approximately equal to an uplink path loss from the NR UE4 to the network device 3, and the terminal device determines, based on the transmit power information of the downlink reference signal and the measurement value of the downlink reference signal, the downlink path loss from the network device 3 to the NR UE4. Further, the terminal device may determine, based on the downlink path loss information (for example, $PL_c$), the uplink transmit power used for performing random access, so as to perform random access to the network device (that is, a network device that sends the downlink reference signal, for example, the network device 3 shown in FIG. 1B) based on the uplink transmit power. Optionally, the terminal device may further more accurately estimate, based on the downlink path loss from the network device 3 to the NR UE4 and a path loss adjustment value caused by a deviation between a frequency of a downlink reference signal and an SUL frequency, the uplink path loss from the terminal device NR UE4 to the network device 3. Optionally, for a manner of determining the uplink transmit power based on the downlink path loss information, refer to related content of "determining a PUSCH transmit power" in the foregoing embodiment of this application. Details are not described herein again. Optionally, the method for determining the uplink transmit power of the terminal device on the first SUL resource may be further used for another uplink signal or uplink channel of the first SUL resource, for example, a PUSCH channel, a PUCCH channel, or an SRS channel. This is not limited in this application.

Optionally, the downlink measurement value of the downlink reference signal may be obtained by the terminal device by performing downlink measurement on a downlink reference signal (for example, a CRS, an SSB, or a CSI-RS) sent by the third network device. Certainly, the downlink measurement value of the downlink reference signal may be alternatively measured in another manner. This is not limited in the embodiments of this application.

In the embodiments of this application, the downlink reference signal is received based on the configuration information of the downlink reference signal corresponding to the first SUL resource, and the uplink transmit power used for performing random access is determined based on the downlink measurement value of the downlink reference signal, so as to perform, based on the uplink transmit power, random access to a network device that sends the downlink reference signal. It can be learned that, in the embodiments of this application, the uplink transmit power is determined based on the downlink measurement value of the downlink reference signal that is sent by a target network device of random access or the third network device specified by a target network device, so that the uplink transmit power can be accurately determined. This further improves random access efficiency of a communications system, and also reduces inter-cell interference.

The methods in FIG. 2A and FIG. 3 may be used together or independently. This is not limited in this application.

Figure 4:
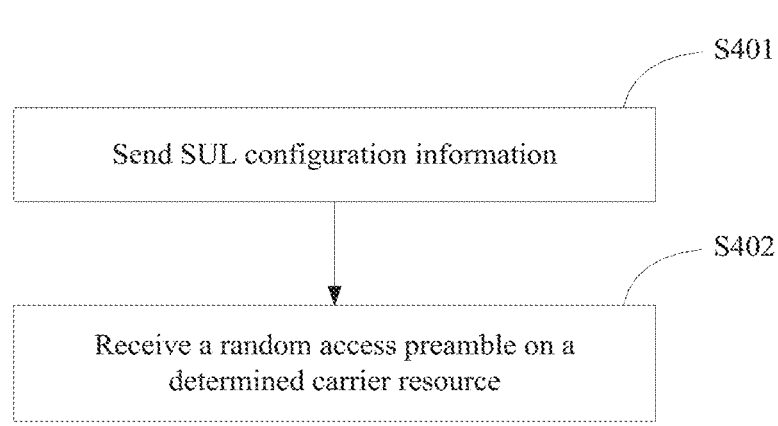
FIG. 4 is a schematic flowchart of a random access method according to another embodiment of this application.

FIG. 4 is a schematic flowchart of a random access method according to another embodiment of this application. Based on the foregoing embodiments, this embodiment of this application describes the method on a network device side. As shown in FIG. 4, the method in the embodiments of this application may include the following steps.

Step S401: Send SUL configuration information.

In this step, a network device (for example, a first network device) sends the SUL configuration information to a terminal device (for example, an NR terminal that supports uplink sharing), so that the terminal device can determine, based on the SUL configuration information, a carrier resource used for random access. Optionally, the SUL configuration information may include at least one first SUL resource and at least one SUL selection threshold that are corresponding to a first SSB. The carrier resource may include one of the at least one first SUL resource or include a non-SUL resource corresponding to the first SSB. Certainly, the SUL configuration information may further include other information. For details, refer to related content in step S201. Details are not described herein again.

Specifically, for a manner of determining, by the terminal device based on the SUL configuration information, the carrier resource used for random access, refer to related content in step S202. Details are not described herein again.

Optionally, the SUL configuration information in the embodiments of this application may be carried in a SIB or RMSI, or certainly, may be carried in another message. This is not limited in the embodiments of this application.

Step S402: Receive a random access preamble on the determined carrier resource.

In this embodiment, after determining, based on the at least one SUL selection threshold in the SUL configuration information, the carrier resource used for random access, the terminal device performs random access (for example, including sending the random access preamble) on the determined carrier resource. In this step, the network device receives, on the determined carrier resource, the random access preamble sent by the terminal device, and performs other processing of random access. For a specific random access procedure, refer to related content described in the foregoing embodiments of this application. Details are not described again in the embodiments of this application.

In the embodiments of this application, the network device sends the SUL configuration information (including the at least one first SUL resource and the at least one SUL selection threshold that are corresponding to the first SSB), so that the terminal device determines, based on a downlink measurement value of the first SSB and the at least one SUL selection threshold in the SUL configuration information, the carrier resource used for random access, and performs random access on the determined carrier resource, where the carrier resource includes the one of the at least one first SUL resource or the non-SUL resource corresponding to the first SSB. Further, the network device receives, on the determined carrier resource, the random access preamble sent by the terminal device. It can be learned that, in the embodiments of this application, the terminal device can select an appropriate resource from the non-SUL resource and the at least one SUL resource to perform random access, thereby improving random access efficiency of a communications system of LTE-NR cosite deployment and/or LTE-NR non-cosite deployment.

Figure 5:
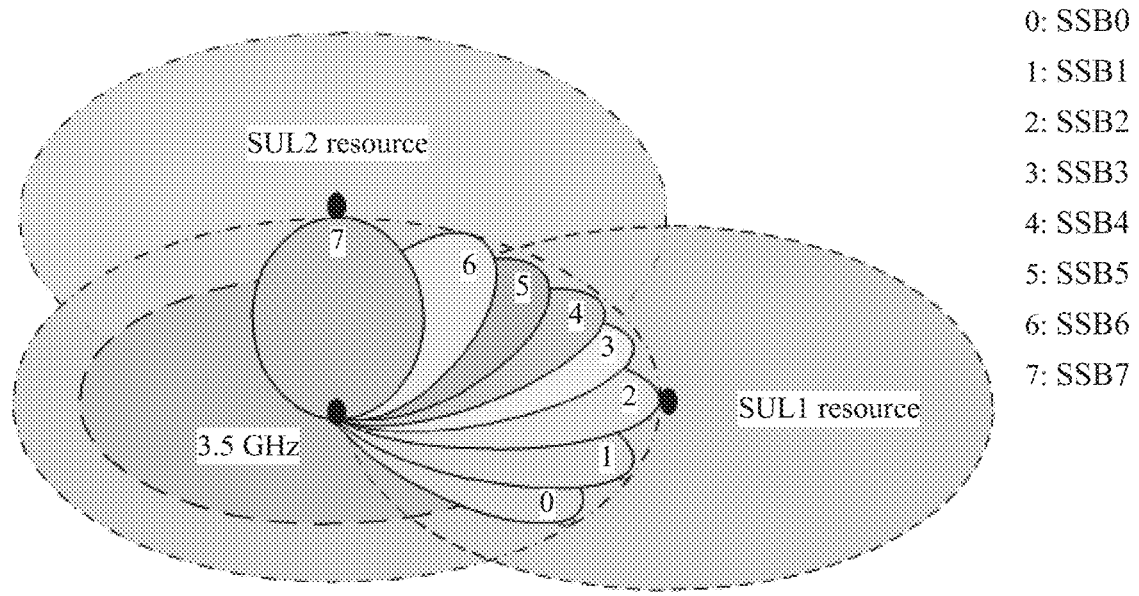
FIG. 5 is a schematic diagram of an association relationship between an SSB and an SUL resource according to an embodiment of this application.

FIG. 5 is a schematic diagram of an association relationship between an SSB and an SUL resource according to an embodiment of this application. Based on the foregoing embodiment, this embodiment of this application describes a random access procedure by using an example. A random access method provided in the embodiments of this application may include the following steps.

Step S501: A terminal device receives a first message sent by a first network device.

In this step, the first message may include SUL configuration information and configuration information of a non-SUL resource. The configuration information of the non-SUI, resource may include: frequency-domain information and common configuration information of the non-SUL resource. Specifically, for the frequency-domain information of the non-SUL resource, reference may be made to related content of the frequency-domain information of the uplink resource in the foregoing embodiment, and details are not described herein again; and/or for the common configuration information of the non-SUL resource, reference may be made to related content of the common configuration information of the uplink resource in the foregoing embodiment, and details are not described herein again. For a specific implementation of the SUL configuration information, refer to related content of the SUL configuration information in the foregoing embodiment. Details are not described herein again.

Optionally, the SUL configuration information and the configuration information of the non-SUL resource may be respectively carried in two different messages (for example, the SUL configuration information is carried in a second message, and the configuration information of the non-SUL resource is carried in a third message) for sending. This is not limited in the embodiments of this application. Optionally, the first message, the second message, the third message, and/or the like in the embodiments of this application may be a system broadcast message such as a radio resource control (RRC) message.

Step S502: The terminal device determines, based on the first message, a carrier resource used for random access, and may further determine, based on the first message, an uplink transmit power for performing random access.

For example, with reference to FIG. 5, it is assumed that the SUL configuration information includes SSB0 to SSB7, and an SUL resource corresponding to at least one SSB. For example, SSB0 to SSB4 are corresponding to an SUL1 resource, and SSB5 to SSB7 are corresponding to an SUL2 resource.

In this step, the terminal device selects a first SSB (for example, the SSB0) from a plurality of received SSBs, and determines, based on a downlink measurement value of the SSB0 and an SUL selection threshold carried in the SUL configuration information (or a preset SUL selection threshold), a carrier resource used for random access. Optionally, if the downlink measurement value of the SSB0 is less than the SUL selection threshold, the terminal device determines that the carrier resource used for random access includes the SUL1 resource corresponding to the SSB0; or if the downlink measurement value of the SSB0 is greater than or equal to the SUL selection threshold, the terminal device determines that the carrier resource used for random access includes the non-SUL resource.

Optionally, if determining that the carrier resource used for random access includes the SUL1 resource corresponding to the SSB0, the terminal device may receive, based on configuration information, carried in the SUL configuration information, of a downlink reference signal corresponding to the SUL1 resource, the downlink reference signal sent by a third network device, and may accurately determine an uplink transmit power based on a downlink measurement value of the downlink reference signal.

Optionally, if determining that the carrier resource used for random access includes the non-SUL resource, the terminal device may directly determine the uplink transmit power based on a downlink measurement value of the first SSB and transmit power information of the first SSB.

Optionally, in step S503, the terminal device sends a random access preamble to the first network device based on the uplink transmit power.

In this step, the terminal device may select a target random access preamble from a plurality of random access preambles carried in the first message, and send the target random access preamble to the first network device on the determined carrier resource based on the uplink transmit power.

Optionally, in step S504, the first network device sends a random access response to the terminal device.

In this step, the first network device may perform blind detection on the random access preamble on a PRACH, and send a response RAR based on slot and frequency-domain locations of a carrier on which the blindly detected random access preamble is located.

Optionally, to distinguish between different random access preambles used by different terminal devices in a same slot and a same frequency-domain resource on a same carrier, a MAC-subheader of an RAR includes an RAPID. The terminal device continues to decode uplink grant information in the RAR only when the RAPID in the RAR is the same as an identifier of the random access preamble sent by the terminal device in step S503.

Optionally, when a beam corresponding to one SSB is associated with a maximum of one SUL resource, to identify that two terminal devices use a same random access preamble on different carriers, in different slots, on different frequency-domain resources, or on beams corresponding to different SSBs, the first network device may use an RA-RNTI related to a slot identity (ID), a frequency-domain resource ID, and/or a carrier ID, to scramble a PDCCH, where the PDCCH is used to transmit grant control information of an RAR. For example, a value of the carrier ID may be a first preset value (for example, 0) or a second preset value (for example, 1). The carrier ID being the first preset value indicates a non-SUL resource, and a carrier ID being the second preset value indicates an SUL resource.

Optionally, in step S505, the terminal device obtains the uplink grant information based on the detected RAR, and sends an M3 message on the determined carrier resource (that is, the carrier resource on which the random access preamble is sent in step S503).

Optionally, in step S506, the first network device detects, on the corresponding carrier resource, the M3 message sent by the terminal device, and sends an M4 message to the terminal device, to complete RRC connection establishment.

Optionally, for specific implementations of steps in the embodiments of this application, refer to related content of the "random access procedure" in the foregoing embodiment of this application. Details are not described herein again.

In conclusion, in the embodiments of this application, the terminal device determines, based on the first message, the carrier resource used for random access and an accurate uplink transmit power, and performs random access on the determined carrier resource based on the uplink transmit power, thereby improving random access efficiency of a communications system.

Based on the foregoing embodiment, an embodiment of this application describes a random access procedure by using an example. A random access method provided in the embodiments of this application may include the following steps.

Step S601: A terminal device receives a fourth message sent by a first network device.

In this step, the fourth message may include SUL configuration information and configuration information of a non-SUL resource. The configuration information of the non-SUL resource may include: frequency-domain information and common configuration information of the non-SUL resource. Specifically, for the frequency-domain information of the non-SUL resource, reference may be made to related content of the frequency-domain information of the uplink resource in the foregoing embodiment, and details are not described herein again; and/or for the common configuration information of the non-SUL resource, reference may be made to related content of the common configuration information of the uplink resource in the foregoing embodiment, and details are not described herein again. For a specific implementation of the SUL configuration information, refer to related content of the SUL configuration information in the foregoing embodiment. Details are not described herein again.

Optionally, the SUL configuration information and the configuration information of the non-SUL resource may be respectively carried in two different messages (for example, the SUL configuration information is carried in a fifth message, and the configuration information of the non-SUL resource is carried in a sixth message) for sending. This is not limited in the embodiments of this application. Optionally, the fourth message, the fifth message, and/or the sixth message in the embodiments of this application may be a system broadcast message such as an RRC message.

Step S602: The terminal device determines, based on the fourth message, a carrier resource used for random access, and may further determine, based on the fourth message, an uplink transmit power for performing random access.

For example, with reference to FIG. 5, it is assumed that the SUL configuration information includes SSB0 to SSB7, an SUL resource corresponding to at least one SSB, and access priority information. For example, SSB0 to SSB5 are corresponding to an SUL1 resource, SSB4 to SSB7 are corresponding to an SUL2 resource, the SUL1 resource of a plurality of SUL resources corresponding to the SSB4 has a highest priority, and the SUL2 resource of a plurality of SUL resources corresponding to the SSBS has a highest priority.

In this step, the terminal device selects a first SSB (for example, the SSBS) from a plurality of received SSBs, and determines, based on a downlink measurement value of the SSBS and an SUL selection threshold carried in the SUL configuration information (or a preset SUL selection threshold), the carrier resource used for random access. For example, if the downlink measurement value of the SSBS is less than the SUL selection threshold, the terminal device determines that the carrier resource used for random access includes the SUL2 resource corresponding to the SSB5, or if the downlink measurement value of the SSB5 is greater than or equal to the SUL selection threshold, the terminal device determines that the carrier resource used for random access includes the non-SUL resource.

Optionally, if a power of a random access preamble in the random access procedure performed based on the SUL2 resource reaches a preset maximum threshold or a quantity of transmissions reaches a preset maximum quantity of transmissions of the random access preamble of the SUL2 resource, the terminal device may re-determine that the carrier resource used for random access includes the SUL1 resource corresponding to the SSB5, instead of giving up random access and performing cell selection.

Optionally, if a power of a random access preamble in the random access procedure performed based on the SUL1 resource reaches a preset maximum threshold or a quantity of transmissions reaches a preset maximum quantity of transmissions of the random access preamble of the SUL1 resource, the terminal device may re-determine that the carrier resource used for random access includes a non-SUL resource, instead of giving up random access and performing cell selection.

Optionally, if determining that the carrier resource used for random access includes the SUL resource corresponding to the SSB5 (for example, the SUL1 resource or the SUL2 resource), the terminal device may receive, based on configuration information, carried in the SUL configuration information, of a downlink reference signal corresponding to the SUL resource, the downlink reference signal sent by a third network device, and may accurately determine an uplink transmit power based on a downlink measurement value of the downlink reference signal.

Optionally, if determining that the carrier resource used for random access includes the non-SUL resource, the terminal device may directly determine the uplink transmit power based on a downlink measurement value of the first SSB and transmit power information of the first SSB.

Optionally, in step S603, the terminal device sends a random access preamble to the first network device based on the uplink transmit power.

In this step, the terminal device may select a target random access preamble from a plurality of random access preambles carried in the fourth message, and send the target random access preamble to the first network device on the determined carrier resource based on the uplink transmit power.

Optionally, in step S604, the first network device sends a random access response to the terminal device.

In this step, the first network device may perform blind detection on the random access preamble on a PRACH, and send a response RAR based on slot and frequency-domain locations of a carrier on which the blindly detected random access preamble is located.

Optionally, to distinguish between different random access preambles used by different terminal devices in a same slot and a same frequency-domain resource on a same carrier, a MAC-subheader of an RAR includes an RAPID. The terminal device continues to decode uplink grant information in the RAR only when the RAPID in the RAR is the same as an identifier of the random access preamble sent by the terminal device in step S603.

Optionally, when a beam corresponding to one SSB is associated with a maximum of one SUL resource, to identify that two terminal devices use a same random access preamble on different carriers, in different slots, on different frequency-domain resources, or on beams corresponding to different SSBs, the first network device may use an RA-RNTI related to a slot ID, a frequency-domain resource ID, and/or a carrier ID, to scramble a PDCCH, where the PDCCH is used to transmit grant control information of an RAR. For example, a value of the carrier ID may be a first preset value example, 0) or a second preset value (for example, 1). The carrier ID being the first preset value indicates a non-SUL resource, and a carrier ID being the second preset value indicates an SUL resource.

Optionally, when a beam corresponding to one SSB is associated with a maximum of N (where N is an integer greater than 1) SUL resources, to identify that two terminal devices use a same random access preamble on different carriers, in different slots, on different frequency domain resources, or on beams corresponding to different SSBs, the first network device may use an RA-RNTI related to a slot ID, a frequency-domain resource ID, and/or a carrier to scramble a PDCCH, where the PDCCH is used to transmit grant control information of an RAR. For example, a value of the carrier ID may be a first preset value (for example, 0), a second preset value (for example, 1), a third preset value, ..., and an $(N+1)^{th}$ preset value (for example, N). The carrier ID being the first preset value indicates a non-SUL resource, the carrier ID being the second preset value indicates a first SUL resource associated with the beam corresponding to the SSB, the carrier ID being the third preset value indicates a second SUL resource associated with the beam corresponding to the SSB, ..., and by analogy, the carrier ID being the $(N+1)^{th}$ preset value indicates an $(N+1)^{th}$ SUL resource associated with the beam corresponding to the SSB.

Optionally, in step S605, the terminal device obtains the uplink grant information based on the detected RAR, and sends an M3 message on the determined carrier resource (that is, the carrier resource on which the random access preamble is sent in step S603).

Step S606: The third network device detects, on the corresponding carrier resource, the M3 message sent by the terminal device, and sends an M4 message to the terminal device, to complete RRC connection establishment.

Optionally, for specific implementations of steps in the embodiments of this application, refer to related content of the "random access procedure" in the foregoing embodiment of this application. Details are not described herein again.

In conclusion, in the embodiments of this application, the terminal device determines, based on the fourth message, the carrier resource used for random access and an accurate uplink transmit power, and performs random access on the determined carrier resource based on the uplink transmit power, thereby improving random access efficiency of a communications system.

In a random access method provided in another embodiment of this application, in the wireless communication scenario of LTE-NR cosite deployment shown in FIG. 1C, a possible implementation of how a terminal device selects an appropriate carrier resource to perform random access is described. Optionally, the method in the embodiments of this application may include the following steps.

Step S701: A terminal device receives SUL configuration information, where the SUL configuration information may include at least one SUL resource, and a cell and a selection threshold that are corresponding to the at least one SUL resource.

In this step, the terminal device receives the SUL configuration information sent by a network device. Optionally, the SUL configuration information may include the at least one SUL resource, and the cell and the selection threshold that are corresponding to the at least one SUL resource. Certainly, the SUL configuration information may further include other information. This is not limited in the embodiments of this application.

For example, if the SUL configuration information includes at least two SUL resources, the at least two SUL resources may be corresponding to one selection threshold, or the at least two SUL resources may be corresponding to a plurality of selection thresholds (for example, the at least two SUL resources are corresponding to different selection thresholds, or some of the at least two SUL resources may be corresponding to one selection threshold).

For example, one SUL resource may be corresponding to at least one cell (for example, an NR cell). Optionally, when one SUL resource is corresponding to one cell (for example, a first cell), the SUL configuration information may not include related information of another cell. When one SUL resource is corresponding to two cells (for example, a first cell and a second cell), the SUL configuration information further includes related information of the second cell. For example, SUL configuration information of an NR cell 1 (corresponding to the first cell) may include configuration information of an SUL1 resource example, including a cell and/or a selection threshold that are corresponding to the SUL1 resource) and configuration information of an SUL2 resource (for example, including a cell and/or a selection threshold that are corresponding to the SUL2 resource). The SUL1 resource associated with the NR cell 1 is not associated with an NR cell 2, and the SUL2 resource associated with the NR cell 1 is associated with the NR cell 2. In this case, the configuration information of the SUL2 resource may further include related information of the NR cell 2 (corresponding to the second cell). Optionally, the related information of the NR cell 2 may include but is not limited to reference signal information of the NR cell 2 (for example, an SSB frequency-domain location of the NR cell 2, a physical cell ID, a transmit power of an SSB, and/or a selection threshold corresponding to the NR cell 2).

Optionally, the SUL configuration information in the embodiments of this application may be carried in a SIB or RMSI, or certainly, may be carried in another message. This is not limited in the embodiments of this application.

Step S702: The terminal device determines, based on a downlink measurement value of a current cell and a downlink measurement value of a neighboring cell, a carrier resource used for random access.

In this step, the terminal device determines, based on the downlink measurement value of the current cell (for example, the NR cell 1) and the downlink measurement value of the neighboring cell (for example, the NR cell 2), the carrier resource used for random access. The carrier resource includes one SUL resource corresponding to the current cell, one SUL resource corresponding to the neighboring cell, or a non-SUL resource corresponding to the current cell. Optionally, the downlink measurement value may be a reference signal received power (RSRP), or certainly, may be another downlink measurement result. This is not limited in the embodiments of this application.

Optionally, if the downlink measurement value of the current cell (for example, the NR cell 1) is less than a selection threshold corresponding to the current cell, and the downlink measurement value of the neighboring cell (for example, the NR cell 2) is less than a selection threshold corresponding to the neighboring cell, it is determined that the carrier resource used for random access includes the one SUL resource for example, the SUL1 resource) corresponding to the current cell (for example, the NR cell 1).

Optionally, if the downlink measurement value of the current cell (for example, the NR cell 1) is less than a selection threshold corresponding to the current cell, and the downlink measurement value of the neighboring cell (for example, the NR cell is greater than a selection threshold corresponding to the neighboring cell, it is determined that the carrier resource used for random access includes the one SUL resource (for example, the SUL2 resource) corresponding to the neighboring cell (for example, the NR cell 2).

Optionally, if the downlink measurement value of the current cell (for example, the NR cell 1) is greater than a selection threshold corresponding to the current cell, it is determined that the carrier resource used for random access includes the non-SUL resource corresponding to the current cell.

Step S703: The terminal device performs random access on the determined carrier resource.

In this step, the terminal device performs random access on the determined carrier resource. For a specific random access procedure, refer to related content described in the foregoing embodiments of this application. Details are not described again in the embodiments of this application.

In the embodiments of this application, the terminal device receives the SUL configuration information, where the SUL configuration information may include the at least one SUL resource, and the cell and the selection threshold that are corresponding to the at least one SUL resource. Further, the terminal device determines, based on the downlink measurement value of the current cell and the downlink measurement value of the neighboring cell, the carrier resource used for random access, and performs random access on the determined carrier resource, where the carrier resource includes the one SUL resource corresponding to the current cell, the one SUL resource corresponding to the neighboring cell, and the non-SUL resource corresponding to the current cell. Therefore, in the embodiments of this application, in a wireless communication scenario in which LTE coverage and NR coverage are not aligned, the terminal device can still select an appropriate carrier resource to perform random access, thereby improving random access efficiency of a communications system.

With an increasing quantity of terminal device users, user traffic and a data throughput constantly increase, and a requirement for spectrum resources also constantly grows. However, radio spectrum resources are insufficient, and it is difficult to find contiguous high bandwidth resources for mobile communication. Therefore, a CA technology is introduced. To be specific, a plurality of contiguous or noncontiguous spectrum resources (for example, carriers) are aggregated for use, to meet a requirement for a high bandwidth in mobile communication, and improve utilization of scattered spectrums.

At present, in the CA technology, a terminal device can support aggregation of a plurality of carriers. When carrier aggregation is performed in a plurality of serving cells, usually a primary serving cell or a primary component carrier is configured for the terminal device, and a PUCCH resource is configured on an uplink carrier of the primary component carrier, for users to jointly feed back ACKs/NACKs of downlink data of one serving cell or a plurality of aggregated serving cells. When an excessively large quantity of serving cells are aggregated, a relatively large quantity of bits of an acknowledgement (ACK)/negative acknowledgement (HACK) need to be fed back on the PUCCH resource on the uplink carrier of the primary component carrier or the primary serving cell. As a result, the PUCCH resource of the primary component carrier is congested. Therefore, two PUCCH cell groups (for example, a primary PUCCH cell group and a secondary PUCCH cell group) are introduced to the CA technology, where one PUCCH cell group includes one PUCCH resource, used to feed back an ACK/NACK of downlink data of the cell group. Optionally, in a plurality of carriers or serving cells of carrier aggregation, PUCCH resources are configured on uplink carriers of a maximum of two serving cells, where the uplink carriers include an uplink carrier of a primary serving cell or a primary component carrier in the primary PUCCH cell group, and an uplink carrier of a secondary component carrier or a secondary serving cell in the secondary PUCCH cell group.

For a serving cell including an SUL resource, the SUL resource is used to improve uplink coverage of the terminal device. In addition, to increase a user throughput, a plurality of carriers may be configured for the terminal device, to increase the user throughput by using the carrier aggregation technology.

For example, the serving cell including the SUL resource, configured for the terminal device, may be a serving cell including a PUCCH resource in a PUCCH cell group (for example, the primary PUCCH cell group and/or the secondary PUCCH cell group).

For example, the serving cell including the SUL resource may belong to a carrier (used by the terminal device for transmitting a PUCCH resource) of an SUL resource or a non-SUL resource.

Certainly, the serving cell including the SUL resource may alternatively belong to another serving cell or a carrier resource. This is not limited in the embodiments of this application.

In the embodiments provided in this application, the methods provided in the embodiments of this application are described from perspectives of the terminal device, the network device, and interaction between the network device and the terminal device. To implement the functions in the methods provided in the embodiments of this application, the network device and the terminal device may include a hardware structure and/or a software module, and implement the functions by using the hardware structure, the software module, or a combination of the hardware structure and the software module. Whether a function of the foregoing functions is executed by using the hardware structure, the software module, or a combination of the hardware structure and the software structure depends on a specific application and a design constraint of the technical solution.

Figure 6:
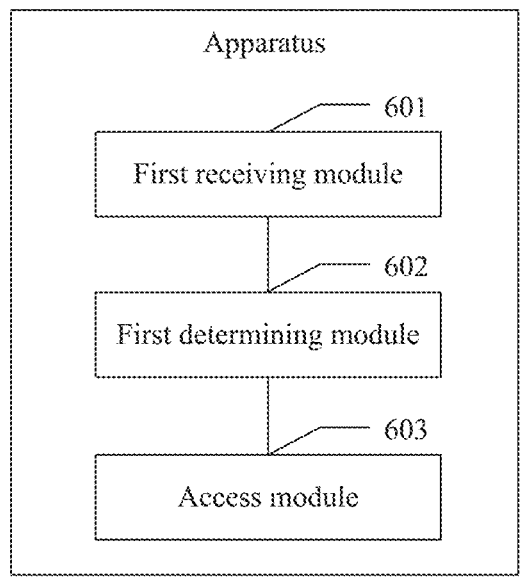
FIG. 6 is a schematic structural diagram of an apparatus according to an embodiment of this application.

An embodiment of this application provides an apparatus, to implement functions of the terminal device in the foregoing methods. The apparatus may be a terminal device or an apparatus in a terminal device. FIG. 6 is a schematic structural diagram of an apparatus according to an embodiment of this application. Referring to FIG. 6, the apparatus includes: a first receiving module 601, a first determining module 602, and an access module 603. The first receiving module 601 is configured to receive SUL configuration information, where the SUL configuration information includes at least one first supplementary uplink SUL resource and at least one SUL selection threshold that are corresponding to a first SSB. The first determining module 602 is configured to determine, based on a downlink measurement value of the first SSB and the at least one SUL selection threshold, a carrier resource used for random access, where the carrier resource includes one of the at least one first SUL resource or includes a non-SUL resource corresponding to the first SSB. The access module 603 is configured to perform random access on the determined carrier resource.

Specifically, the first receiving module 601, the first determining module 602, and the access module 603 can execute corresponding functions executed by the terminal device in the foregoing random access method embodiments of this application. Details are not described herein again.

In this apparatus embodiment of this application, the module division is an example, and is merely logical function division and may be another division manner during actual implementation. In addition, functional modules in the embodiments of this application may be integrated into one processor, or each of the functional modules may exist alone physically, or two or more modules may be integrated into one module. The integrated module may be implemented in a form of hardware, or may be implemented in a form of a software functional module.

Figure 7:
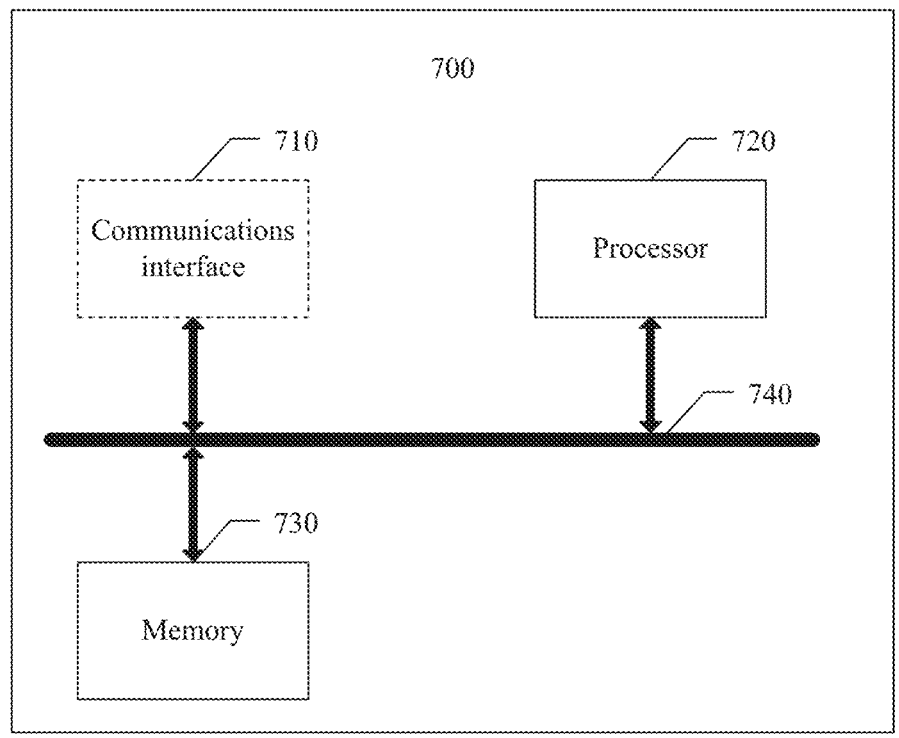
FIG. 7 is a schematic structural diagram of an apparatus according to another embodiment of this application.

FIG. 7 is a schematic structural diagram of an apparatus according to another embodiment of this application. As shown in FIG. 7, the apparatus 700 provided in the embodiments of this application is configured to implement functions of the terminal device in the foregoing method. The apparatus may be a terminal device or an apparatus in a terminal device. The apparatus may be a chip system. In the embodiments of this application, the chip system may include a chip, or may include a chip and another discrete device. The apparatus 700 includes at least one processor 720, configured to implement the functions of the terminal device in the random access method provided in the foregoing embodiments of this application. For example, the processor 720 may receive SUL configuration information, determine, based on a downlink measurement value of a first SSB and at least one SUL selection threshold, a carrier resource used for random access, perform random access on the determined carrier resource, and the like. For details, refer to specific descriptions in the method embodiments. Details are not described herein again.

The apparatus 700 may further include at least one memory 730, configured to store a program instruction and/or data. The memory 730 is coupled to the processor 720. A coupling in the embodiments of this application is an indirect coupling or a communication connection between apparatuses, units, or modules, and may be implemented in electrical, mechanical, or other forms, to implement information exchange between the apparatuses, the units, or the modules. The processor 720 may be in a collaborative operation with the memory 730. The processor 720 may invoke and execute the program instruction stored in the memory 730.

The apparatus 700 may further include a communications interface 710, configured to perform communication between the apparatus 700 and another apparatus. The communications interface 710 may be a circuit, a bus, a transceiver, or another apparatus, and this is not limited in this application. For example, the communications interface 710 may be a transceiver, configured to perform communication with another apparatus through a transmission medium, so that the apparatus 700 can perform communication with the another apparatus. For example, the another apparatus may be a network device. The processor 720 sends and receives data and/or information by using the communications interface 710, and is configured to implement corresponding functions executed by the terminal device in the foregoing random access method embodiments of this application. During implementation, steps of a processing procedure may be implemented by using an integrated logic circuit of hardware in the processor 720, or by using an instruction in a software form.

This embodiment of this application does not limit a specific connection medium between the communications interface 710, the processor 720, and the memory 730. In the embodiments of this application, in FIG. 7, the memory 730, the processor 720, and the communications interface 710 are connected by using a bus 740, and the bus is represented by a bold line in FIG. 7. This is merely an example, and is not intended for limitation. There may be other connection manners between the components. The bus may be classified into an address bus, a data bus, a control bus, and the like. For ease of representation, only one bold line is used to represent the bus in FIG. 7, but this does not mean that there is only one bus or only one type of bus.

An embodiment of this application further provides a chip system. The chip system includes a processor, and may further include a memory. The chip system is configured to implement functions of the terminal device in the foregoing random access method embodiments of this application. Implementation principles and technical effects are similar to those in the method embodiments, and details are not described herein again. Optionally, the chip system may include a chip, or may include a chip and another discrete device.

An embodiment of this application further provides a program. When the program is executed by a processor, the program is used to execute the technical solution about the terminal device in the foregoing random access method embodiments of this application. Implementation principles and technical effects are similar to those in the method embodiments, and details are not described herein again.

An embodiment of this application further provides a computer program product including an instruction. When the computer program product is run on a computer, the computer is enabled to execute the technical solution about the terminal device in the foregoing random access method embodiments of this application. Implementation principles and technical effects are similar to those in the method embodiments, and details are not described herein again.

An embodiment of this application further provides a computer-readable storage medium. The computer-readable storage medium stores an instruction. When the instruction is run on a computer, the computer is enabled to execute the technical solution about the terminal device in the foregoing random access method embodiments of this application. Implementation principles and technical effects are similar to those in the method embodiments, and details are not described herein again.

Figure 8:
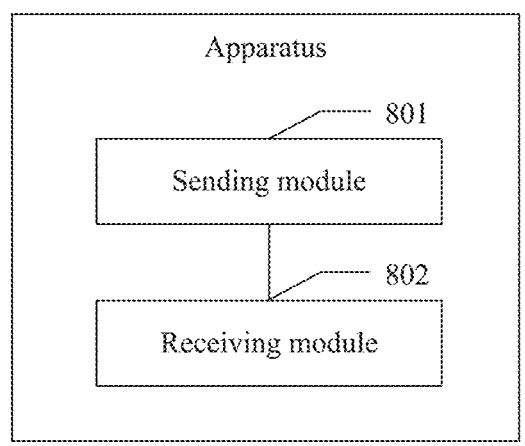
FIG. 8 is a schematic structural diagram of an apparatus according to another embodiment of this application.

An embodiment of this application provides an apparatus, configured to implement functions of the network device (for example, the first network device) in the foregoing methods. The apparatus may be a network device or an apparatus in a network device. FIG. 8 is a schematic structural diagram of an apparatus according to another embodiment of this application. As shown in FIG. 8, the apparatus includes a sending module 801 and a receiving module 802. The sending module 801 is configured to send SUL configuration information, here the SUL configuration information includes at least one first supplementary uplink SUL resource and at least one SUL selection threshold that are corresponding to a first SSB, the SUL configuration information is used to determine a carrier resource used for random access, and the carrier resource includes one of the at least one first SUL resource or includes a non-SUL resource corresponding to the first SSB. The receiving module 802 is configured to receive a random access preamble on the determined carrier resource.

Specifically, the sending module 801 and the receiving module 802 can execute corresponding functions executed by the network device in the foregoing random access method embodiments of this application. Details are not described herein again.

In this apparatus embodiment of this application, the module division is an example, and is merely logical function division and may be another division manner during actual implementation. In addition, functional modules in the embodiments of this application may be integrated into one processor, or each of the functional modules may exist alone physically, or two or more modules may be integrated into one module. The integrated module may be implemented in a form of hardware, or may be implemented in a form of a software functional module.

Figure 9:
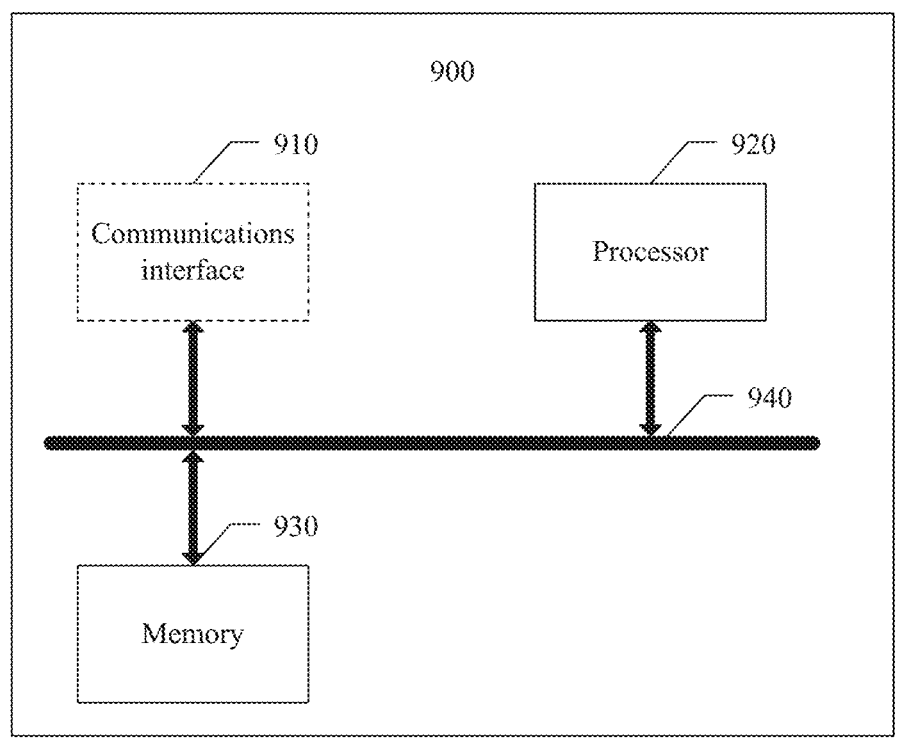
FIG. 9 is a schematic structural diagram of an apparatus according to another embodiment of this application.

FIG. 9 is a schematic structural diagram of an apparatus according to another embodiment of this application. As shown in FIG. 9, the apparatus 900 provided in the embodiments of this application is configured to implement functions of the network device (for example, the first network device) in the foregoing method. The apparatus may be a network device or an apparatus in a network device. The apparatus may be a chip system. The apparatus 900 includes at least one processor 920, configured to implement the functions of the network device in the random access method provided in the foregoing embodiments of this application. For example, the processor 920 can generate and send SUL configuration information, receive a random access preamble, and the like. For details, refer to specific descriptions in the method embodiments. Details are not described herein again.

The apparatus 900 may further include at least one memory 930, configured to store a program instruction and/or data. The memory 930 is coupled to the processor 920. A coupling in the embodiments of this application is an indirect coupling or a communication connection between apparatuses, units, or modules, and may be implemented in electrical, mechanical, or other forms, to implement information exchange between the apparatuses, the units, or the modules. The processor 920 may be in a collaborative operation with the memory 930. The processor 920 may invoke and execute the program instruction stored in the memory 930.

The apparatus 900 may further include a communications interface 910, configured to perform communication between the apparatus 900 and another apparatus. The communications interface 910 may be a circuit, a bus, a transceiver, or another apparatus, and this is not limited in this application. For example, the communications interface 910 may be a transceiver, configured to perform communication with another apparatus through a transmission medium, so that the apparatus 900 can perform communication with the another apparatus. For example, the another apparatus may be a terminal device. The processor 920 sends and receives data and/or information by using the communications interface 910, and is configured to implement corresponding functions executed by the network device in the foregoing random access method embodiments of this application. During implementation, steps of a processing procedure may be implemented by using an integrated logic circuit of hardware in the processor 920, or by using an instruction in a software form.

This embodiment of this application does not limit a specific connection medium between the communications interface 910, the processor 920, and the memory 930. In the embodiments of this application, in FIG. 9, the memory 930, the processor 920, and the communications interface 910 are connected by using a bus 940, and the bus is represented by a bold line in FIG. 9. This is merely an example, and is not intended for limitation. There may be other connection manners between the components. The bus may be classified into an address bus, a data bus, a control bus, and the like. For ease of representation, only one bold line is used to represent the bus in FIG. 9, but this does not mean that there is only one bus or only one type of bus.

In the embodiments of this application, a processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

In the embodiments of this application, the memory may be a non-volatile memory such as a hard disk drive (HDD), a solid-state drive (SSD), or the like, or may be a volatile memory such as a random-access memory (RAM), or may be a circuit or any other apparatus that can implement a storage function. The memory may alternatively be any other medium that can be used to carry or store expected program code in a form of an instruction or a data structure and that can be accessible to a computer, but is not limited thereto.

An embodiment of this application further provides a chip system. The chip system includes a processor, and may further include a memory. The chip system is configured to implement functions of the network device in the foregoing random access method embodiments of this application. Implementation principles and technical effects are similar to those in the method embodiments, and details are not described herein again. Optionally, the chip system may include a chip, or may include a chip and another discrete device.

An embodiment of this application further provides a program. When the program is executed by a processor, the program is used to execute the technical solution about the network device in the foregoing random access method embodiments of this application. Implementation principles and technical effects are similar to those in the method embodiments, and details are not described herein again.

An embodiment of this application further provides a computer program product including an instruction. When the computer program product is run on a computer, the computer is enabled to execute the technical solution about the network device in the foregoing random access method embodiments of this application. Implementation principles and technical effects are similar to those in the method embodiments, and details are not described herein again.

An embodiment of this application further provides a computer-readable storage medium. The computer-readable storage medium stores an instruction. When the instruction is run on a computer, the computer is enabled to execute the technical solution about the network device in the foregoing random access method embodiments of this application. Implementation principles and technical effects are similar to those in the method embodiments, and details are not described herein again.

An embodiment of this application further provides a communications system. The communications system includes at least one network device and at least one terminal device. The terminal device may use a structure in the apparatus embodiment shown in FIG. 6 and/or FIG. 7, and correspondingly, can execute the technical solutions provided in the foregoing random access method embodiments. The network device may use a structure in the apparatus embodiment shown in FIG. 8 and/or FIG. 9, and correspondingly, can execute the technical solutions provided in the foregoing random access method embodiments. Implementation principles and technical effects are similar to those in the method embodiments, and details are not described herein again.

In the several embodiments provided in this application, it should be understood that the disclosed apparatus and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses, or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented by using a combination of hardware and a software functional unit.

A person of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, through a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

What is claimed is:

1. A method, comprising:
sending supplementary uplink (SUL) configuration information, wherein the SUL configuration information comprises N first SUL resources and at least one SUL selection threshold that are corresponding to a first synchronization signal block (SSB), wherein N is an integer greater than or equal to 2, wherein the SUL configuration information is used to determine a carrier resource used for random access, wherein the SUL configuration information comprises access priority information, wherein the access priority information is used to determine a second SUL resource from the N first SUL resources, wherein the access priority information indicates an access priority order of the N first SUL resources, wherein an access priority of the second SUL resource is higher than a priority of a SUL resource of the N first SUL resources other than the second SUL resource, and wherein the carrier resource comprises the second SUL resource or comprises a non-SUL resource corresponding to the first SSB; and receiving a random access preamble on the determined carrier resource.

2. The method according to claim 1, wherein the SUL configuration information comprises one SUL selection threshold corresponding to the first SSB.

3. The method according to claim 1, wherein the SUL configuration information comprises N3 SUL selection thresholds corresponding to the first SSB, wherein N3 is an integer greater than or equal to 2, and wherein one of the N first SUL resources is corresponding to one of the N3 SUL selection thresholds.

4. The method according to claim 1, wherein the SUL configuration information comprises N SUL selection thresholds corresponding to the first SSB, and wherein one of the N first SUL resources is corresponding to one of the N SUL selection thresholds.

5. An apparatus, comprising:
at least one processor; and
a memory coupled to the at least one processor and storing programming instructions for execution by the at least one processor, wherein the programming instructions instruct the at least one processor to perform operations comprising:
receiving supplementary uplink (SUL) configuration information, wherein the SUL configuration information comprises N first SUL resources and at least one SUL selection threshold that are corresponding to a first SSB, wherein N is an integer greater than or equal to 2;
determining a second SUL resource from the N first SUL resources based on access priority information, wherein the access priority information indicates an access priority order of the N first SUL resources, and wherein an access priority of the second SUL resource is higher than a priority of a SUL resource of the N first SUL resources other than the second SUL resource;
determining, based on a downlink measurement value of the first SSB and the at least one SUL selection threshold, a carrier resource used for random access, wherein the carrier resource comprises the second SUL resource or comprises a non-SUL resource corresponding to the first SSB; and
performing random access on the determined carrier resource.

6. The apparatus according to claim 5, wherein the SUL configuration information comprises one SUL selection threshold corresponding to the first SSB, wherein the operations further comprise:
in response to determining that the downlink measurement value of the first SSB is greater than or equal to the one SUL selection threshold corresponding to the first SSB, determining that the carrier resource used for random access comprises the non-SUL resource; or
in response to determining that the downlink measurement value of the first SSB is less than the one SUL selection threshold corresponding to the first SSB, determining, based on the access priority information, that the carrier resource used for random access comprises the second SUL resource.

7. The apparatus according to claim 5, wherein the SUL configuration information comprises N3 SUL selection thresholds corresponding to the first SSB, wherein N3 is an integer greater than or equal to 2, wherein one of the N first SUL resources is corresponding to one of the N3 SUL selection thresholds, wherein the operations further comprise:
determining, based on the downlink measurement value of the first SSB and an SUL selection threshold corresponding to the second SUL resource, the carrier resource used for random access.

8. The apparatus according to claim 7, wherein the operations further comprise:
in response to determining that the downlink measurement value of the first SSB is greater than or equal to the SUL selection threshold corresponding to the second SUL resource, determining that the carrier resource used for random access comprises the non-SUL resource; or
in response to determining that the downlink measurement value of the first SSB is less than the SUL selection threshold corresponding to the second SUL resource, determining that the carrier resource used for random access comprises the second SUL resource.

9. The apparatus according to claim 5, wherein the SUL configuration information comprises N SUL selection thresholds corresponding to the first SSB, wherein one of the N first SUL resources is corresponding to one of the N SUL selection thresholds, wherein the operations further comprise:
in response to determining that the downlink measurement value of the first SSB is less than a SUL selection threshold corresponding to a third SUL resource and is greater than or equal to a SUL selection threshold corresponding to a fourth SUL resource, determining that the carrier resource used for random access comprises the third SUL resource, wherein the third SUL resource and the fourth SUL resource are comprised in the N first SUL resources;
in response to determining that the downlink measurement value of the first SSB is less than an SUL selection threshold corresponding to a fifth SUL resource, determining that the carrier resource used for random access comprises the fifth SUL resource, wherein the SUL selection threshold corresponding to the fifth SUL resource is a smallest value of the N SUL selection thresholds; or
in response to determining that the downlink measurement value of the first SSB is greater than or equal to a SUL selection threshold corresponding to a sixth SUL resource, determining that the carrier resource used for random access comprises the non-SUL resource, wherein the SUL selection threshold corresponding to the sixth SUL resource is a largest value of the N SUL selection thresholds.

10. The apparatus according to claim 5, wherein the carrier resource used for random access comprises the second SUL resource, wherein the operations further comprise:
receiving a downlink reference signal based on configuration information of the downlink reference signal corresponding to the second SUL resource; and
determining an uplink transmit power based on a downlink measurement value of the downlink reference signal, wherein the uplink transmit power is used for performing random access.

11. The apparatus according to claim 10, wherein the SUL configuration information further comprises the configuration information of the downlink reference signal corresponding to the second SUL resource.

12. An apparatus, comprising:
at least one processor; and
a memory coupled to the at least one processor and storing programming instructions for execution by the at least one processor, wherein the programming instructions instruct the at least one processor to perform operations comprising:
sending supplementary uplink (SUL) configuration information, wherein the SUL configuration information comprises N first SUL resources and N SUL selection thresholds that are corresponding to a first SSB, wherein N is an integer greater than or equal to 2, wherein the SUL configuration information is used to determine a carrier resource used for random access, wherein one of the N first SUL resources is corresponding to one of the N SUL selection thresholds, wherein the carrier resource comprises one of the N first SUL resources or comprises a non-SUL resource corresponding to the first SSB, and wherein:
when a downlink measurement value of the first SSB is less than a SUL selection threshold corresponding to a second SUL resource and is greater than or equal to a SUL selection threshold corresponding to a third SUL resource, the carrier resource used for random access comprises the second SUL resource, wherein the second SUL resource and the third SUL resource are comprised in the N first SUL resources;
when the downlink measurement value of the first SSB is less than an SUL selection threshold corresponding to a fourth SUL resource, the carrier resource used for random access comprises the fourth SUL resource, wherein the SUL selection threshold corresponding to the fourth SUL resource is a smallest value of the N SUL selection thresholds; or
when the downlink measurement value of the first SSB is greater than or equal to a SUL selection threshold corresponding to a fifth SUL resource, the carrier resource used for random access comprises the non-SUL resource, wherein the SUL selection threshold corresponding to the fifth SUL resource is a largest value of the N SUL selection thresholds; and
receiving a random access preamble on the determined carrier resource.

\* \* \* \* \*